(12) United States Patent
Cherkasova

(10) Patent No.: US 7,953,843 B2
(45) Date of Patent: May 31, 2011

(54) SYSTEM AND METHOD FOR EVALUATING A HETEROGENEOUS CLUSTER FOR SUPPORTING EXPECTED WORKLOAD IN COMPLIANCE WITH AT LEAST ONE SERVICE PARAMETER

(75) Inventor: Ludmila Cherkasova, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1779 days.

(21) Appl. No.: 10/867,392

(22) Filed: Jun. 14, 2004

(65) Prior Publication Data

US 2005/0278453 A1    Dec. 15, 2005

(51) Int. Cl.
*G06F 15/173* (2006.01)

(52) U.S. Cl. ......... 709/224; 709/226; 709/231; 718/105

(58) Field of Classification Search .................. 709/224, 709/226, 231; 718/105
See application file for complete search history.

(56) References Cited

U.S. PATENT DOCUMENTS

| | | | |
|---|---|---|---|
| 5,603,029 A | 2/1997 | Aman et al. | |
| 5,732,239 A | 3/1998 | Tobagi et al. | |
| 5,734,119 A | 3/1998 | France et al. | |
| 5,815,662 A | 9/1998 | Ong | |
| 5,828,847 A * | 10/1998 | Gehr et al. | 709/239 |
| 5,890,162 A * | 3/1999 | Huckins | 707/104.1 |
| 5,953,707 A | 9/1999 | Huang et al. | |
| 6,067,107 A | 5/2000 | Travaille et al. | |
| 6,101,547 A | 8/2000 | Mukherjee et al. | |
| 6,178,480 B1 | 1/2001 | Tobagi et al. | |
| 6,263,361 B1 | 7/2001 | Hoyer et al. | |
| 6,279,039 B1 | 8/2001 | Bhat et al. | |
| 6,282,569 B1 * | 8/2001 | Wallis et al. | 709/224 |
| 6,292,834 B1 | 9/2001 | Ravi et al. | |
| 6,356,947 B1 | 3/2002 | Lutterschmidt | |
| 6,434,621 B1 | 8/2002 | Pezzillo et al. | |
| 6,438,592 B1 | 8/2002 | Killian | |
| 6,516,350 B1 * | 2/2003 | Lumelsky et al. | 709/226 |
| 6,529,950 B1 * | 3/2003 | Lumelsky et al. | 709/218 |
| 6,571,288 B1 | 5/2003 | Sarukkai | |
| 6,606,658 B1 | 8/2003 | Uematsu | |
| 6,728,748 B1 * | 4/2004 | Mangipudi et al. | 718/105 |
| 6,757,735 B2 | 6/2004 | Apostolopoulos | |
| 6,996,618 B2 | 2/2006 | Apostolopoulos | |
| 7,216,165 B2 | 5/2007 | Dalal | |
| 7,310,681 B2 | 12/2007 | Cherkasova | |
| 7,424,528 B2 | 9/2008 | Cherkasova | |

(Continued)

OTHER PUBLICATIONS

Acharya, S. et al., "Characterizing User Access to Videos on the World Wide Web," Part of the IS&T/SPIE Conference on Multimedia Computing and Networking 2000, SPIE vol. 3969, 2000, pp. 130-141.

(Continued)

*Primary Examiner* — Yves Dalencourt
*Assistant Examiner* — Michael C Lai

(57) ABSTRACT

According to at least one embodiment, a method comprises receiving, into a capacity planning system, workload information representing an expected workload of client accesses of streaming media files from a site. The method further comprises receiving, into the capacity planning system, at least one service parameter that defines a desired service characteristic to be provided by a heterogeneous cluster of servers under the expected workload. The capacity planning system evaluates whether the heterogeneous cluster, having a plurality of different server configurations included therein, is capable of supporting the expecting workload in compliance with the at least one service parameter.

32 Claims, 12 Drawing Sheets

U.S. PATENT DOCUMENTS

| | | | |
|---|---|---|---|
| 7,610,381 | B2 | 10/2009 | Cherkasova |
| 2002/0083124 | A1 | 6/2002 | Knox et al. |
| 2002/0091722 | A1 | 7/2002 | Gupta et al. |
| 2002/0129048 | A1 | 9/2002 | Qiu et al. |
| 2002/0150102 | A1 | 10/2002 | Janko et al. |
| 2002/0156552 | A1 | 10/2002 | Whiting |
| 2003/0097443 | A1 | 5/2003 | Gillett et al. |
| 2003/0115244 | A1 | 6/2003 | Molloy et al. |
| 2003/0158913 | A1 | 8/2003 | Agnoli |
| 2004/0054780 | A1 | 3/2004 | Romero |
| 2004/0111509 | A1* | 6/2004 | Eilam et al. .................. 709/224 |
| 2004/0162901 | A1 | 8/2004 | Mangipudi |

OTHER PUBLICATIONS

Almeida, J. et al., "Analysis of Educational Media Server Workloads," Proc. 11th Int'l. Workshop, 2001, 10 pages.

Chase, J. et al., "Managing Energy and Server Resources in Hosting Centers," Dept. of Computer Science, Duke University, 14 pages.

U.S. Appl. No. 10/306,279, Cherkasova et al.

U.S. Appl. No. 10/660,978, Cherkasova et al.

U.S. Appl. No. 10/601,956, Cherkasova et al.

U.S. Appl. No. 10/601,992, Cherkasova et al.

Cherkasova, L. et al., "Characterizing Locality, Evolution, and Life Span of Accesses in Enterprise Media Server Workloads," NOSSDAV '02, May 12-14, 2002, 10 pages.

Cherkasova, L. et al., "Building a Performance Model of Streaming Media Applications in Utility Data Center Environment," Hewlett-Packard Laboratories, Internet Systems and Storage Lab, 8 pages.

Cherkosova, L. et al., "Sizing the Streaming Media Cluster Solution for a Given Workload," Hewlett-Packard Laboratories, 8 pages.

"Data center virtualization benefits", [Online] Retrieved Dec. 12, 2003 Retrieved from http://h71028.www7.hp.com/enterprise/cache—2 pages.

Dan, A. et al., "Buffering and Caching in Large-Scale Video Servers," IEEE 1995, pp. 217-224.

Eager, D. et al., "Optimal and Efficient Merging Schedules for Video-on-Demand Servers," Proc. ACM Multimedia 1999, 4 pages.

U.S. Appl. No. 10/738,273, filed Dec. 17, 2003, Cherkasova et al.

U.S. Appl. No. 10/801,793, filed Mar. 16, 2004, Cherkasova et al.

Kim, I. et al., "VBR Video Data Scheduling using Window-Based Prefetching," IEEE 1999, pp. 159-164.

Nahrstedt, K. et al., "A Probe-based Algorithm for QoS Specification and Adaptation," Univ. of Illinois at Urbana Champaign, pp. 1-12.

Nahrstedt, K. et al., "QoS-Aware Resource Managment for Distributed Multimedia Applications," Univ. of Illinois at Urbana Champaign, Dept. of Computer Science, pp. 1-37.

Ranjan, S. et al., "QoS-Driven Server Migration for Internet Data Centers," Proc. of IWQoS 2002, 10 pages.

Shenoy, P. et al., "Middleware versus Native OS Support: Architectural Considerations for Supporting Multimedia Applications," Univ. of Massachusetts, Dept. of Computer Science, 10 pages.

Anderson, R. et al., "Unraveling the Mysteries Of Clustering", [Online] Retrieved Jan. 6, 2004 Retrieved from http://www.nwc.com—5 pages.

Definition of "Cluster Computing", [Online] Retrieved Jan. 6, 2004 Retrieved from http://search390.techtarget.com/sDefinition—3 pages.

"Cluster" [Online] Retrieved Jan. 6, 2004 Retrieved from http://whatis.techtarget.com/definition 4 pages.

"HP Utility Data Center", [Online] Retrieved Dec. 12, 2003 Retrieved from http://h71028.www7.hp.com/enterprise/cache—2 pages.

"Data center virtualization overview", [Online] Retrieved Dec. 12, 2003 Retrieved from http://h71028.www7.hp.com/enterprise/cache—2 pages.

"Data center virtualization architecture", [Online] Retrieved Dec. 12, 2003 Retrieved from http://h71028.www7.hp.com/enterprise/cache—2 pages.

U.S. Patent Office, U.S. Appl. No. 10/738,273, Final Rejection dated May 18, 2010, pp. 1-55.

U.S. Patent Office, U.S. Appl. No. 10/738,273, Non-Final Rejection dated Nov. 25, 3009, pp. 1-54 and attachments.

U.S. Patent Office, U.S. Appl. No. 10/738,273, Final Rejection dated Dec. 10, 2008, pp. 1-9.

U.S. Patent Office, U.S. Appl. No. 10/738,273, Non-Final Rejection dated May 15, 2008, pp. 1-43 and attachments.

U.S. Patent Office, U.S. Appl. No. 10/738,273, Requirement for Restriction/Election dated Jan. 14, 2008, pp. 1-7 and attachments.

* cited by examiner

| TIME | 28Kb/s | | 56Kb/s | | 112Kb/s | | 256Kb/s | | 350Kb/s | | 500Kb/s | |
|---|---|---|---|---|---|---|---|---|---|---|---|---|
| | MEMORY | DISK | MEMORY | DISK | MEMORY | DISK | MEMORY | DISK | MEMORY | DISK | MEMORY | DISK |
| ... | ... | ... | ... | ... | ... | ... | ... | ... | ... | ... | ... | ... |
| $T_1$ | 2 | 1 | 0 | 2 | 3 | 0 | 6 | 1 | 5 | 0 | 8 | 2 |
| ... | ... | ... | ... | ... | ... | ... | ... | ... | ... | ... | ... | ... |

CONCURRENT CONNECTIONS

OUTPUT OF MEDIA PROFILER: MEDIA SITE WORKLOAD PROFILE 203

| TIME STAMP | CONCURRENT SESSIONS | <56Kb/s | | 56-112Kb/s | | >112Kb/s | |
|---|---|---|---|---|---|---|---|
| | | DISK | MEMORY | DISK | MEMORY | DISK | MEMORY |
| ⋮ | ⋮ | ⋮ | ⋮ | ⋮ | ⋮ | ⋮ | ⋮ |
| $t_i-1$ | 100 | 2 | 0 | 5 | 2 | 85 | 6 |
| $t_i$ | 104 | 2 | 0 | 5 | 2 | 89 | 6 |
| $t_i+1$ | 103 | 1 | 0 | 5 | 2 | 89 | 6 |
| ⋮ | ⋮ | ⋮ | ⋮ | ⋮ | ⋮ | ⋮ | ⋮ |

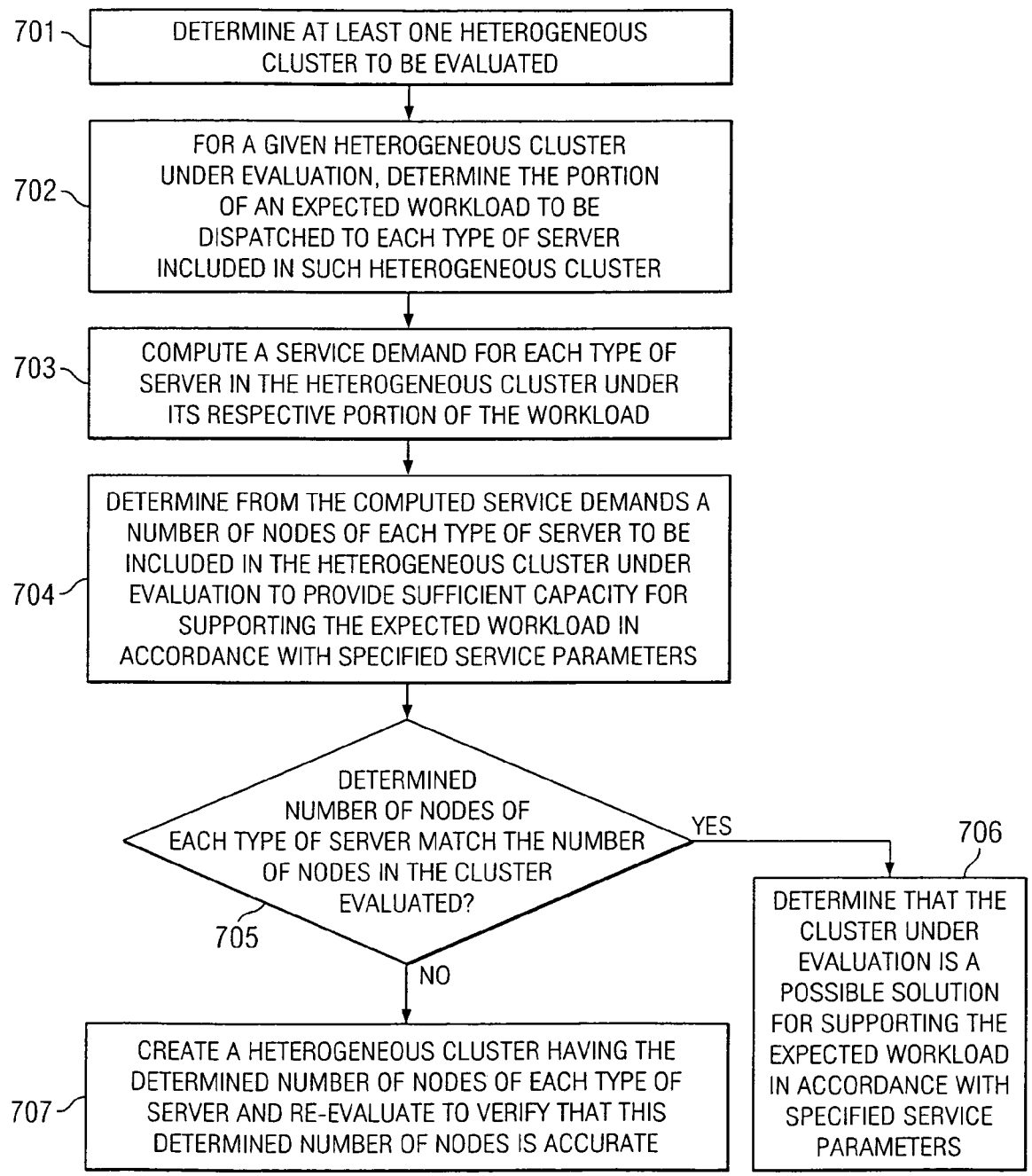

FIG. 9

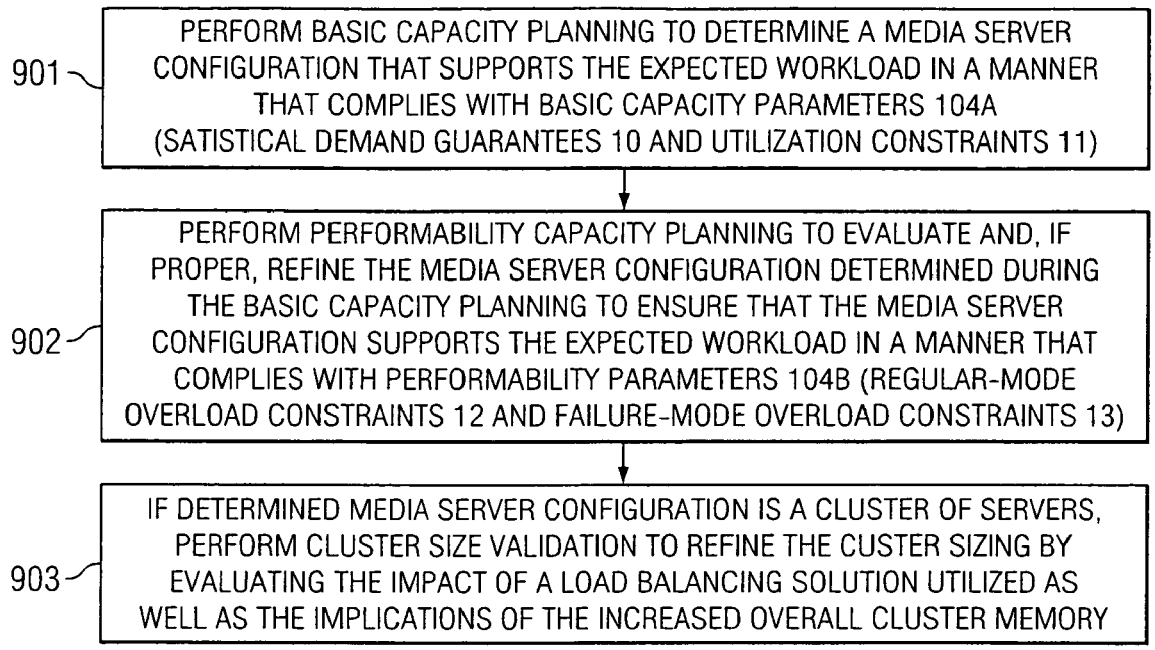

901 — PERFORM BASIC CAPACITY PLANNING TO DETERMINE A MEDIA SERVER CONFIGURATION THAT SUPPORTS THE EXPECTED WORKLOAD IN A MANNER THAT COMPLIES WITH BASIC CAPACITY PARAMETERS 104A (SATISTICAL DEMAND GUARANTEES 10 AND UTILIZATION CONSTRAINTS 11)

902 — PERFORM PERFORMABILITY CAPACITY PLANNING TO EVALUATE AND, IF PROPER, REFINE THE MEDIA SERVER CONFIGURATION DETERMINED DURING THE BASIC CAPACITY PLANNING TO ENSURE THAT THE MEDIA SERVER CONFIGURATION SUPPORTS THE EXPECTED WORKLOAD IN A MANNER THAT COMPLIES WITH PERFORMABILITY PARAMETERS 104B (REGULAR-MODE OVERLOAD CONSTRAINTS 12 AND FAILURE-MODE OVERLOAD CONSTRAINTS 13)

903 — IF DETERMINED MEDIA SERVER CONFIGURATION IS A CLUSTER OF SERVERS, PERFORM CLUSTER SIZE VALIDATION TO REFINE THE CUSTER SIZING BY EVALUATING THE IMPACT OF A LOAD BALANCING SOLUTION UTILIZED AS WELL AS THE IMPLICATIONS OF THE INCREASED OVERALL CLUSTER MEMORY

FIG. 10A

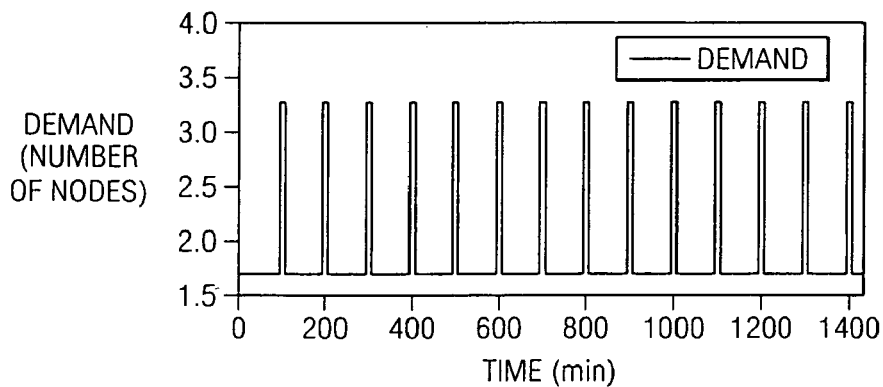

FIG. 10B

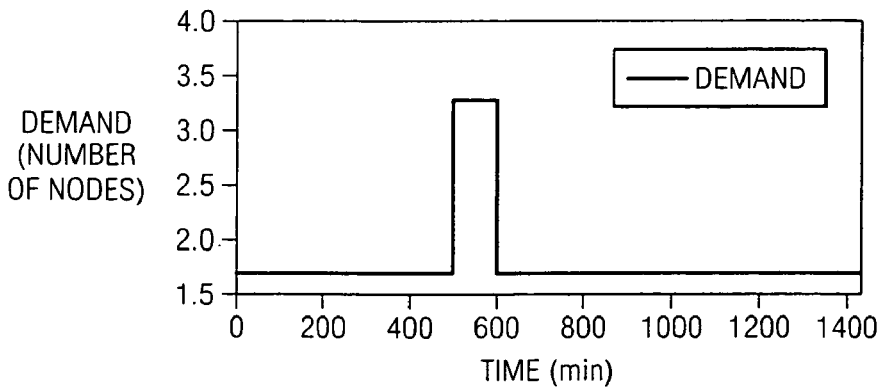

SYSTEM AND METHOD FOR EVALUATING A HETEROGENEOUS CLUSTER FOR SUPPORTING EXPECTED WORKLOAD IN COMPLIANCE WITH AT LEAST ONE SERVICE PARAMETER

CROSS-REFERENCE TO RELATED APPLICATIONS

This application is related to the following and commonly assigned patent applications: 1) U.S. patent application Ser. No. 10/306,279 filed Nov. 27, 2002 entitled "SYSTEM AND METHOD FOR MEASURING THE CAPACITY OF A STREAMING MEDIA SERVER," now U.S. Pat. No. 7,424,528, 2) U.S. application Ser. No. 10/601,956 filed Jun. 23, 2003 entitled "SYSTEM AND METHOD FOR MODELING THE MEMORY STATE OF A STREAMING MEDIA SERVER," now U.S. Pat. No. 7,310,681, 3) U.S. application Ser. No. 10/601,992 filed Jun. 23, 2003 entitled "COST-AWARE ADMISSION CONTROL FOR STREAMING MEDIA SERVER," now U.S. Patent Application Publication No. 2004/0260619. 4) U.S. application Ser. No. 10/660,978 filed Sep. 12, 2003 entitled "SYSTEM AND METHOD FOR EVALUATING A CAPACITY OF A STREAMING MEDIA SERVER FOR SUPPORTING A WORKLOAD," now U.S. Patent Application Publication No. 2005/0060389, 5) U.S. application Ser. No. 10/738,273 filed Dec. 17, 2003 entitled "SYSTEM AND METHOD FOR DETERMINING HOW MANY SERVERS OF AT LEAST ONE SERVER CONFIGURATION TO BE INCLUDED AT A SERVICE PROVIDER'S SITE FOR SUPPORTING AN EXPECTED WORKLOAD," now U.S. Patent Application Publication No. 2005/0138170, 6) U.S. application Ser. No. 10/801,793 filed Mar. 16, 2004 entitled "SYSTEM AND METHOD FOR DETERMINING A STREAMING MEDIA SERVER CONFIGURATION FOR SUPPORTING EXPECTED WORKLOAD IN COMPLIANCE WITH AT LEAST ONE SERVICE PARAMETER," and now U.S. Patent Application Publication No. 2005/0228879, 7) U.S. application Ser. No. 10/867,556, filed concurrently herewith entitled "SYSTEM AND METHOD FOR EVALUATING CAPACITY OF A HETEROGENEOUS MEDIA SERVER CONFIGURATION FOR SUPPORTING AN EXPECTED WORKLOAD," now U.S. Patent Application Publication No. 2005/0278439, the disclosures of which are hereby incorporated herein by reference.

FIELD OF THE INVENTION

The following description relates in general to evaluating a capacity of a streaming media server for supporting a workload, and more particularly to a system and method for evaluating whether a cluster of heterogeneous servers is capable of supporting an expected workload in compliance with at least one service parameter.

DESCRIPTION OF RELATED ART

An abundance of information is available on client-server networks, such as the Internet, Intranets, the World Wide Web (the "web"), other Wide and Local Area Networks (WANs and LANs), wireless networks, and combinations thereof, as examples, and the amount of information available on such client-server networks is continuously increasing. Further, users are increasingly gaining access to client-server networks, such as the web, and commonly look to such client-server networks (as opposed to or in addition to other sources of information) for desired information. For example, a relatively large segment of the human population has access to the Internet via personal computers (PCs), and Internet access is now possible with many mobile devices, such as personal digital assistants (PDAs), mobile telephones (e.g., cellular telephones), etc.

An increasingly popular type of technology for providing information to clients is known as "streaming media." In general, streaming media presents data (e.g., typically audio and/or video) to a client in a streaming or continuous fashion. That is, with streaming media a client is not required to receive all of the information to be presented before the presentation begins. Rather, presentation of information in a streaming media file may begin before all of the file is received by the client, and as the received portion of the file is being presented, further portions of the file continue to be received by the client for later presentation. Thus, streaming media involves media (e.g., typically audio and/or video) that is transmitted from a server (e.g., a media server) to a client and begins playing on the client before fully downloaded.

Media servers are typically implemented for providing streaming media to clients. A "cluster" is often used to implement a media server. In general, a cluster is a group of nodes (e.g., servers and/or other resources) that appear to a user as a single system. For instance, a plurality of servers may be implemented as a cluster to form a single media server for serving streaming media files to requesting clients. While a plurality of different servers are used for servicing the clients' requests, to each client the cluster appears to be a single media server (i.e., it appears to the clients that they are accessing a single media server). Such cluster computing may be implemented to provide high availability (e.g., through redundancy provided by the plurality of nodes), parallel processing, and/or load balancing. Various load balancing strategies may be used for a cluster, including as examples a round-robin strategy or a "locality-aware" strategy, e.g., Locality-Aware Request Distribution ("LARD") strategy.

Various streaming media files may be provided concurrently by a media server to various different clients. That is, a plurality of clients may concurrently access streaming media files from the media server. Of course, limits exist as to how many concurrent streams a media server can support for a given client population. That is, limits exist as to the capacity of a media server, even a clustered media server, for supporting a given "workload" (i.e., a number of concurrent client accesses of streaming media from the media server). Streaming media service providers have traditionally had difficulty in evaluating whether a given media server configuration (e.g., a server implementation having a certain size of memory, certain disk configuration, certain number of nodes in a cluster, etc.) provides sufficient capacity for supporting the service providers' workload as desired. Thus, streaming media service providers have traditionally had difficulty in evaluating different media server configurations for capacity planning to, for example, determine the most cost-effective configuration that is capable of supporting the service providers' media service workload.

BRIEF SUMMARY OF THE INVENTION

According to at least one embodiment, a method comprises receiving, into a capacity planning system, workload information representing an expected workload of client accesses of streaming media files from a site. The method further comprises receiving, into the capacity planning system, at least one service parameter that defines a desired service characteristic to be provided by a heterogeneous cluster of servers under the expected workload. The capacity planning system evaluates whether the heterogeneous cluster, having a plurality of different server configurations included therein, is capable of supporting the expected workload in compliance with the at least one service parameter.

According to at least one embodiment, a method comprises receiving, into a capacity planning system, workload information representing an expected workload of client accesses of streaming media files from a site. The method further comprises receiving, into the capacity planning system, at least one service parameter that defines a desired service characteristic to be provided by a heterogeneous cluster of servers under the expected workload. The method further comprises determining, by the capacity planning system, for each of a plurality of different types of server configurations included in the heterogeneous cluster, how many servers to be included in the heterogeneous cluster for supporting the expected workload in compliance with the at least one service parameter.

According to at least one embodiment, a method comprises receiving, into a capacity planning tool, information about a first server configuration, and receiving, into the capacity planning tool, information about a second server configuration. The method further comprises receiving, into the capacity planning tool, workload information representing an expected workload of client accesses of streaming media files from a site, and receiving, into the capacity planning system, at least one performability parameter that defines a desired service characteristic to be provided, during non-compliant periods of operation under the expected workload, by a heterogeneous cluster that includes at least one node of the first server configuration and at least one node of the second server configuration. The capacity planning tool evaluates whether the heterogeneous cluster is capable of supporting the expected workload in compliance with the at least one performability parameter.

According to at least one embodiment, a method comprises receiving, into a capacity planning tool, workload information representing an expected workload of client accesses of streaming media files over a period of time T. The capacity planning tool determines, for each of a plurality of different types of server configurations included in a heterogeneous cluster under evaluation, an amount of overload encountered by such type of server configuration during each of a plurality of time intervals of the expected workload.

According to at least one embodiment, a system comprises means for receiving workload information representing an expected workload of client accesses of streaming media files from a site over a period of time T. The system further comprises means for determining, for a heterogeneous clustered media server configuration under evaluation, an amount of overload encountered by the heterogeneous clustered media server configuration during servicing each of a plurality of time intervals of the expected workload.

According to at least one embodiment, a system comprises a media profiler operable to receive workload information for a service provider's site and generate a workload profile for each of a plurality of different types of server configurations included in a heterogeneous cluster under consideration for supporting the service provider's site. The system further comprises a capacity planner operable to receive the generated workload profiles for the server configurations of the heterogeneous cluster under consideration and evaluate whether the heterogeneous cluster provides sufficient capacity for supporting the site's workload in compliance with defined performability parameters that specify a desired limit on degradation of quality of service provided by the heterogeneous cluster during periods of degraded service.

BRIEF DESCRIPTION OF THE DRAWINGS

FIG. 7 shows another example operational flow diagram for certain embodiments of a capacity planning tool;

FIG. 9 shows an example operational flow diagram for the operation of one embodiment of a capacity planner;

FIG. 10A shows a graph illustrating service demands for a first example workload, referred to as a "Thin Spikes" workload;

FIG. 10B shows a graph illustrating service demands for a second example workload, referred to as a "Fat Spikes" workload;

DETAILED DESCRIPTION

Figure 1:
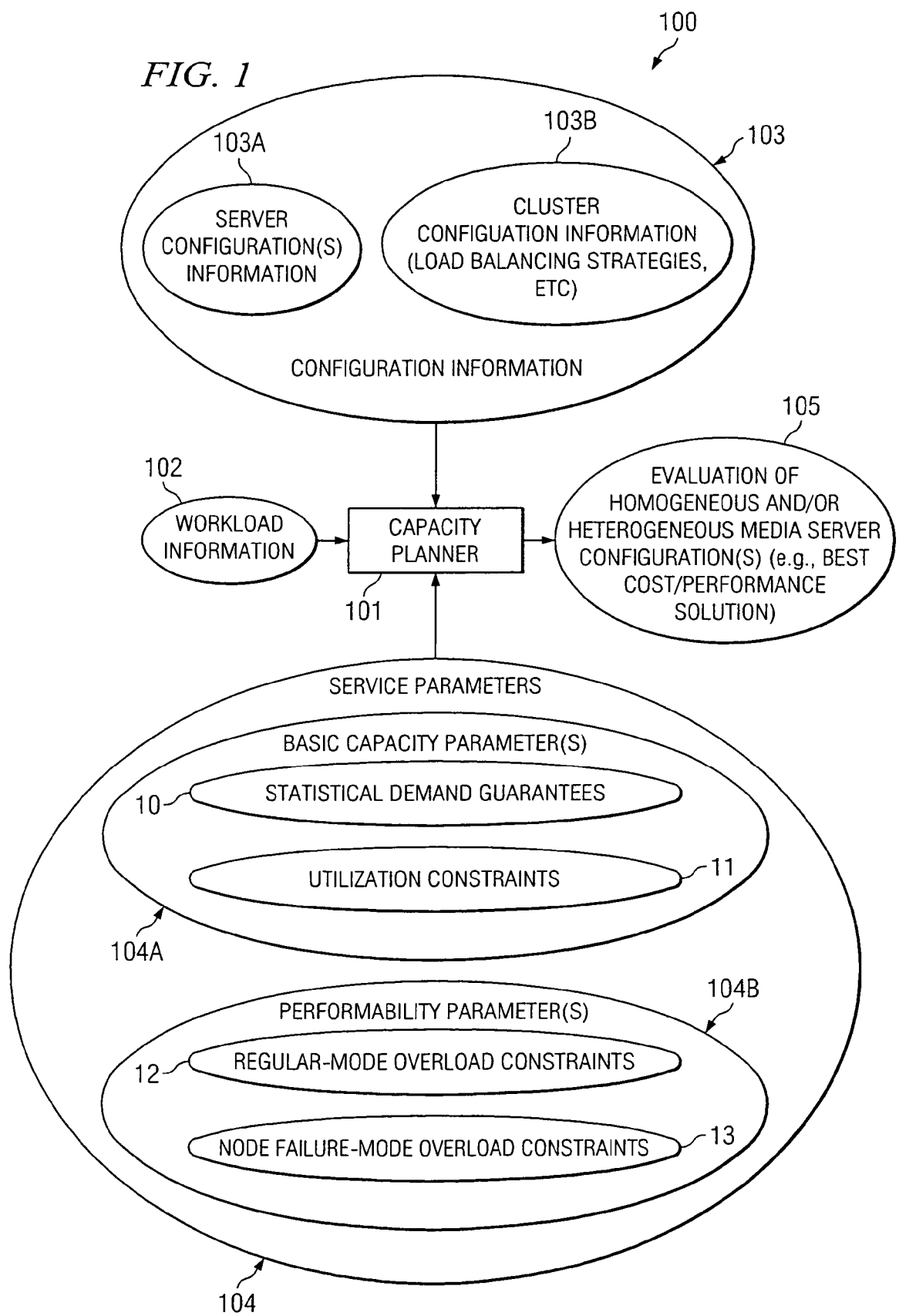
FIG. 1 shows a block diagram of an example embodiment of a capacity planning tool.

Various embodiments of a capacity planning tool (which may also be referred to herein as a "server configuration evaluator") are now described with reference to the above figures, wherein like reference numerals represent like parts throughout the several views. U.S. application Ser. No. 10/738,273 (hereafter "the '273 Application") filed Dec. 17, 2003 entitled "SYSTEM AND METHOD FOR DETERMINING HOW MANY SERVERS OF AT LEAST ONE SERVER CONFIGURATION TO BE INCLUDED AT A SERVICE PROVIDER'S SITE FOR SUPPORTING AN EXPECTED WORKLOAD" now U.S. Patent Application Publication No. 2005/0138170, (the disclosure of which is incorporated herein by reference) provides a capacity planning tool that is operable to determine how many servers of a particular configuration under consideration are needed for forming a cluster of such servers for supporting the expected workload in a desired manner. More specifically, in accordance with at least one embodiment of the capacity planning tool disclosed therein, such capacity planning tool is operable to evaluate an expected workload (e.g., based on past collected access logs for a service provider's site) to determine a number of servers of a given configuration that may be clustered together to form a proper media server configuration for supporting the service provider's expected workload in a desired manner. In accordance with at least one embodiment, a service provider may define certain service parameters that are taken into account by the capacity planning tool in its determination of the proper media server configuration. For example, the service provider can specify certain Statistical Demand Guarantees (e.g., "based on the past workload history, find an appropriate performance solution that 95% of the time is capable of processing the applied load") and/or Utilization Constraints (e.g., "based on the past workload history, find an appropriate performance solution that 90% of the time is utilized under 70% of its capacity"), which are taken into consideration by the capacity planning tool in determining the proper media server configuration. These Statistical Demand Guarantees and Utilization Constraints are referred to herein as "Basic Capacity Parameters."

U.S. patent application Ser. No. 10/801,793 (hereafter "the '793 application") filed Mar. 16, 2004 entitled "SYSTEM AND METHOD FOR DETERMINING A STREAMING MEDIA SERVER CONFIGURATION FOR SUPPORTING EXPECTED WORKLOAD IN COMPLIANCE WITH AT LEAST ONE SERVICE PARAMETER," now U.S. Patent Application Publication No. 2005/0228879, provide embodiments of the capacity planning tool of the '273 application that further allow for the service provider to specify service parameters that define limits as to the amount of service degradation experienced during "non-compliant" periods (periods during which the media server configuration is overloaded). While the Basic Capacity planning process (using the Statistical Demand Guarantees and Utilization Constraints) derives a desirable configuration by sizing the system according to the main performance requirements for the compliant time, it does not provide any guarantees or limits regarding the degradation of the quality of service provided during non-compliant times. For example, in accordance with a Statistical Demand Guarantee that specifies a desired performance solution as one that is capable of processing the applied load with no performance degradation 95% of the time, a media server configuration determined based on this Basic Capacity planning does not provide any guarantees or limits on how "bad" the system performance could be in the remaining 5% of non-compliant time. Further, this does not specify any limits regarding the amount of performance degradation that may be encountered during periods of failure of one or more nodes of a multi-node clustered solution. Embodiments of the capacity planning tool described in the '793 application allow a service provider to specify certain service parameters (referred to as "Performability Parameters") that define limits on how "bad" the system performance may be during the non-compliant time periods (e.g., during periods of performance degradation resulting, for example, from overload and/or node failure in a multi-node cluster system).

The capacity planning tool described in the '273 application works particularly well for determining a cluster size of homogeneous servers. For instance, the capacity planning tool can determine, for an expected workload, the number of servers of a first type "A" (e.g., having a first memory size, disk configuration and speed, processor speed, bandwidth, etc.) that may be clustered together in order to support the workload in a desired manner, and the capacity planning tool can also determine the number of servers of a second type "B" (e.g., having a second memory size, disk configuration and speed, processor speed, bandwidth, etc.) that may be clustered together in order to support the workload in the desired manner. Thus, an evaluation can be made regarding the relative cost, capacity, etc. of the resulting homogeneous cluster solutions (i.e., the cluster solution of servers of type A and the cluster solution of servers of type B) to determine the best (e.g., most cost effective) solution to implement at the service provider's site.

Certain embodiments provided in U.S. patent application Ser. No. 10/867,556 (hereinafter the "'556 Application") entitled "SYSTEM AND METHOD FOR EVALUATING CAPACITY OF A HETEROGENEOUS MEDIA SERVER CONFIGURATION FOR SUPPORTING AN EXPECTED WORKLOAD" now U.S. Patent Application Publication No. 2005/0278439, extend the capacity planning tool of the '273 application to enable evaluation of heterogeneous servers (of different compute power and capacity) that may be clustered together for supporting the expected workload. For instance, in accordance with certain embodiments provided therein, the capacity planning tool is operable to evaluate the capacity of a cluster having a mix of servers of type A and type B to, for example, determine the appropriate mix of such servers (i.e., the appropriate number of servers of each type) to be included in the cluster for supporting the expected workload in a desired manner.

Certain embodiments provided herein further extend the capacity planning tool that is operable to evaluate the capacity of heterogeneous clusters to further allow for the service provider to specify service parameters that define limits as to the amount of service degradation experienced during "non-compliant" periods (periods during which the heterogeneous media server configuration is overloaded). For instance, just as the '793 application provides embodiments of the capacity planning tool of the '273 application that further allows for the service provider to specify service parameters that define limits as to the amount of service degradation experienced during "non-compliant" periods for homogeneous clusters under evaluation, certain embodiments provided herein provide embodiments of the capacity planning tool of the '556 Application that further allows for the service provider to specify service parameters that define limits as to the amount of service degradation experienced during "non-compliant" periods for heterogeneous clusters under evaluation.

Accordingly, in certain embodiments of the capacity planning tool described further herein, the service provider can specify the desirable system performance by stating two types of service parameters (e.g., in a Service Level Agreement (SLA)): 1) Basic Capacity Parameters that define the percentage of time the configuration is capable of processing the workload without performance degradation while satisfying the specified system utilization; and 2) Performability Parameters that define the acceptable degradation of service performance during the remaining, non-compliant time and in case of node failures. Such capacity planning tool may be used, for example, in a scenario in which a service provider, supporting a busy media site, faces a necessity to migrate the site to a new, more efficient infrastructure. More specifically, the capacity planning tool may be used in aiding the service provider in selecting the most appropriate media server configuration to implement in order to achieve the performance desired (in compliance with the defined service parameters).

As described further below, certain embodiments of a capacity planning tool utilize an interval analysis technique. For instance, the capacity planning tool receives workload information representing an expected workload of client accesses of streaming media files over a period of time T. The capacity planning tool then determines, for at least one media server configuration under evaluation (which, as described further herein, may be a heterogeneous clustered media server), an amount of overload encountered by the at least one media server configuration during each of a plurality of time intervals of the expected workload. In certain embodiments, the capacity planning tool determines an interval overload profile for a media server configuration under evaluation, wherein the interval overload profile specifies an amount of overload of the media server configuration for each of a plurality of time intervals of duration I of the expected workload. Thus, the type of overload encountered by the media server configuration under the expected workload can be evaluated, such as determining whether an overload that is substantially continuous for a given interval of time (e.g., 1 hour) is encountered in supporting the expected workload. While it may be helpful to understand that a given media server configuration is overloaded for, say, 5% of the time in supporting the expected workload, it may be further helpful, from a quality of service (QoS) analysis, to understand whether that 5% of overload period comprises short-period bursts of overloads or longer periods of continuous overload. Thus, the capacity planning tool may use the interval overload profile determined for a media server configuration under evaluation to evaluate the type of degradation in quality of service that is encountered during periods of overload.

FIG. 1 shows a block diagram of an example embodiment of a capacity planning tool. As shown, system 100 includes capacity planner 101, which is capable of receiving input information regarding at least one server configuration and an expected (or "forecast") workload. Capacity planner 101 is further operable to make an evaluation of such server configuration(s) under the expected workload, as described further below.

In certain embodiments described below, capacity planner 101 is capable of determining how many servers of particular configurations under consideration are needed for forming a heterogeneous cluster of such servers for supporting the expected workload in a desired manner. More specifically, for a mix of different server (or "node") configurations, capacity planner 101 is operable to determine the number of each server (or "node") type that are needed for supporting the expected workload in a desired manner. For certain expected workloads, a single server may be capable of supporting such workloads in a desired manner. Thus, clustering of a plurality of such servers may be unnecessary for achieving the desired capacity. However, a single server configuration may not be capable of supporting certain other workloads (e.g., the workloads may overload the single server). That is, a site's expected workload may be too great to be adequately supported in the manner desired by the service provider by a single server. In the cases in which a single server is unable to support the expected workload in a desired manner, a plurality of such servers may be clustered together to increase the capacity of the resulting cluster. Further, different types of servers may be clustered together to form a heterogeneous cluster solution. As described further below, in certain embodiments capacity planner 101 is operable to take into consideration one or more load balancing strategies (e.g., round-robin, weighted round-robin, etc.) that may be used by the cluster solution.

Thus, capacity planner 101 can aid a service provider in determining a proper media server configuration to be implemented for supporting its expected workload. For instance, in certain embodiments a service provider specifies a) server configuration information for a plurality of different server configuration types to be considered and b) desired service parameters 104 that a resulting media server (homogeneous of heterogeneous) is to satisfy under the expected workload 102, and capacity planner 101 evaluates how many servers of one or more configuration types are to be clustered together for supporting the service provider's expected workload in the desired manner (in accordance with the specified service parameters 104). In certain embodiments, a service provider specifies one or more of the server configuration types 103A to be considered and load balancing strategy 103B desired to be utilized, and capacity planner 101 further uses this information in determining how many of such servers of the specified configuration type(s) are to be clustered together for supporting the service provider's expected workload in a desired manner (i.e., in accordance with service parameters 104) when the specified load balancing strategy (e.g., round-robin, weighted round-robin, etc.) is utilized for the cluster. In certain other embodiments, the service provider specifies a given server configuration (or a plurality of different server configurations) to be considered, and capacity planner 101 determines the number such servers of the specified configuration type(s) to be clustered together and a proper load balancing strategy (e.g., a proper weighted round-robin strategy) for the cluster to employ for supporting the service provider's expected workload in a manner that satisfies service parameters specified by the service provider.

Thus, the service provider can intelligently determine how many servers of the specified configuration type(s) to implement in the media server cluster for supporting the service provider's site. As described further below, the capacity planner 101 is operable to evaluate a heterogeneous cluster having a mix of servers of different configuration types. Thus, for instance, in at least one embodiment, capacity planner 101 may receive input indicating a number and type of nodes that a service provider desires to include in the cluster solution (e.g., the service provider's existing equipment), and capacity planner 101 evaluates various combinations of other types of server nodes that may be clustered with the input nodes to determine one or more suitable heterogeneous cluster solutions capable of supporting the service provider's expected workload in a desired manner. In other embodiments, the service provider may specify a plurality of different server configurations to be evaluated, and the capacity planning tool evaluates all possible combinations of the different server configurations, including homogeneous solutions and heterogeneous solutions, to determine each solution that is capable of supporting the service provider's expected workload in a desired manner. The service provider, or in some instances the capacity planning tool itself, can make comparisons of the relative cost, capacity, performance, etc. of the various solutions to determine the optimal solution for the service provider's site.

In certain embodiments, capacity planner 101 evaluates a plurality of different server configurations and/or a plurality of different load balancing strategies to determine various different solutions that are each capable of supporting the service provider's expected workload in a desired manner (e.g., in accordance with certain service parameters 104, as discussed further below). For instance, capacity planner 101 may determine that each of the following media server configurations are capable of supporting the service provider's expected workload in the manner desired by the service provider: 1) a homogeneous cluster of 4 servers of configuration type A using load balancing strategy X; 2) a homogeneous cluster of 5 servers of configuration type A using load balancing strategy Y; 3) a heterogeneous cluster having 2 servers of configuration type A and 7 servers of configuration type B using load balancing strategy X; 4) a heterogeneous cluster having 3 servers of configuration type A and 4 servers of configuration type B using load balancing strategy Y; etc. The service provider may then compare the monetary costs, as well as other characteristics, of each solution (i.e., each media server configuration), to identify an optimal solution for its site. In certain embodiments, capacity planner 101 includes monetary cost information for each server configuration such that it is capable of making this comparison for the service provider. In this manner, and as described further below, capacity planner 101 greatly aids a service provider in intelligently determining a media server configuration to be implemented for supporting the service provider's expected workload in the manner desired by the service provider.

In the example of FIG. 1, workload information 102 is received by capacity planner 101. Such workload information may comprise information about a workload of client accesses to one or more streaming media files being served by a media server. In certain implementations the workload information may be actual past access logs collected by a service provider, or it may be an estimated workload that is expected. For instance, media service providers typically collect media server access logs, which reflect processed client requests and client activities at the site. A log of client accesses over a past period of say, 3 months to a year, may provide a representative "view" of the service provider's regular workload, and thus may be used as an "expected" workload for the service provider. From such a log of client accesses, a determination can be made as to the number of concurrent client accesses to a streaming media file from a media server at any given point in the time period for which client accesses were logged. As described further below in conjunction with FIG. 2, in certain embodiments such access log information may be processed to generate a workload profile for the service provider, and the generated workload profile may be used by capacity planner 101 in evaluating the server configuration(s) under consideration.

Further, capacity planner 101 may receive configuration information 103, such as server configuration information 103A (which may be referred to herein as "system configuration information" or "node configuration information") and cluster configuration information 103B shown in the example of FIG. 1. Cluster configuration information 103B may include information about different configurations for clusters that may be used in implementing a clustered media server, such as different load balancing strategies (e.g., round-robin, LARD, etc.) that may be employed for a cluster. Server configuration information 103A may comprise information about one or more server (or "node") configurations (such as configurations $S_1, S_2, S_3$, etc.), such as the respective memory size, disk configuration and speed, processor speed, bandwidth, etc. for a corresponding server configuration. In certain implementations, the server configuration information 103A may also include monetary cost information (or "price") of a corresponding server configuration. Such monetary cost information may be used by capacity planner 101 in certain implementations for evaluating server configurations to determine a most cost-effective media server configuration (e.g., a single server configuration or cluster of a plurality of server configurations) that is capable of supporting the received workload in a manner desired by the service provider (e.g., in accordance with defined service parameters, such as those discussed further below).

As described further below, server configuration information 103A may also include benchmark information, such as the benchmark information described in U.S. patent application Ser. No. 10/306,279 (hereafter "the '279 application") filed Nov. 27, 2002 entitled "SYSTEM AND METHOD FOR MEASURING THE CAPACITY OF A STREAMING MEDIA SERVER," U.S. Patent Application Publication No. 2004/0103189. The '279 application discloses a set of benchmarks for measuring the basic capacities of streaming media systems. The benchmarks allow one to derive the scaling rules of server capacity for delivering media files which are: i) encoded at different bit rates, and ii) streamed from memory versus disk. As the '279 application further describes, a "cost" function can be derived from the set of basic benchmark measurements. This cost function may provide a single value to reflect the combined resource requirement such as CPU, bandwidth, and memory to support a particular media stream depending on the stream bit rate and type of access (e.g., memory file access or disk file access).

Further, capacity planner 101 may receive service parameters 104, which may include Basic Capacity Parameter(s) 104A and/or Performability Parameter(s) 104B, as shown. Service parameters 104 define certain characteristics of the type of service desired to be provided by the service provider under the expected workload. In general, Basic Capacity Parameter(s) 104A define the type of service desired to be provided by the service provider under normal/expected conditions or during "compliant" periods, while Performability Parameter(s) 104B define the type of service desired to be provided by the service provider during non-compliant periods (e.g., periods of degraded performance resulting, for example, from overload and/or failure of one or more nodes of a clustered media server, etc.). Thus, Basic Capacity Parameter(s) 104A allow a service provider to specify the basic level of service desired during normal operating conditions, while Performability Parameter(s) 104B allow a service provider to limit the amount of degradation in quality of service provided during abnormal or "non-compliant" periods, such as limiting the amount of quality of service degradation that is encountered during periods of overload and/or during periods of failed nodes of a clustered media server.

Basic Capacity Parameter(s) 104A may include Statistical Demand Guarantees 10 and/or Utilization Constraints 11. Statistical Demand Guarantees 10 may include information identifying a percentage of time in which the media server solution is not overloaded under the expected workload, such as the desired media server configuration is one capable of supporting the expected workload at least X % (e.g., 99%) of the time. For example, Statistical Demand Guarantees 10 may, in some instances, specify that when presented the expected workload, the desired server configuration is overloaded to the point that it is unable to support the number of concurrent streams that it is serving (thus degrading the quality of service of one or more of those streams) no more than 1% of the time. Utilization Constraints 11 may include information restricting, for example, the amount of time that the desired media server configuration is at or near its capacity under the expected workload. For example, a Utilization Constraint may be defined specifying that the media server configuration desired by the service provider is utilized under 70% of its capacity for at least 90% of the time under the expected workload. Such Utilization Constraint may, for example, allow the service provider to define a certain amount of over-capacity into the desired server configuration to enable future growth of the workload to be supported by the server.

Performability Parameter(s) 104B may include Regular-Mode Overload Constraints 12 and/or Node-Failure-Mode Constraints 13. Regular-Mode Overload Constraints 12 define a limit as to the amount of degradation in service that is to be encountered during non-compliant times periods of performance degradation of regular system operation (i.e., with no node failures encountered in a clustered solution). Node-Failure-Mode Constraints 13 define a limit as to the amount of degradation in service that is to be encountered during periods in which one or more nodes of a clustered media server have failed. The service parameters 104 may, in certain implementations, be variables that can be defined by a service provider.

As described further below, capacity planner 101 is operable to evaluate one or more server configuration types and determine a number of such server configuration types that is capable of supporting the expected workload 102 in compliance with the Basic Capacity Parameter(s) 104A and the Performability Parameter(s) 104B. For instance, in certain embodiments, capacity planner 101 performs basic capacity planning, by taking into account the Basic Capacity Parameter(s) 104A, to determine a desirable media server configuration. The media server configuration evaluated may be a heterogeneous cluster that includes servers of a plurality of different types (e.g., different memory capacities, etc.). Capacity planner 101 then performs performability capacity planning, by taking into account the Performability Parameter(s) 104B, to evaluate and refine the media server configuration determined in the basic capacity planning to ensure that the media server solution complies not only with the Basic Capacity Parameter(s) 104A, but also with the Performability Parameter(s) 104B. In certain embodiments, capacity planner 101 further performs a validation operation to validate the cluster size of the determined media server configuration. If the media server configuration determined by the basic capacity planning and performability capacity planning processes is a single server (single node) configuration, then the capacity planning procedure is completed. Otherwise, capacity planner 101 performs an additional refinement of the cluster sizing by evaluating the impact of the load balancing solution, such as weighted round-robin, as well as the implications of the increased overall cluster memory.

Capacity planner 101 is operable to evaluate one or more configurations 103, such as may be identified by server configuration information 103A and/or cluster configuration information 103B, under the received workload 102, and capacity planner 101 outputs an evaluation 105 of such one or more media server configurations. More specifically, evaluation 105 may include an evaluation of the capacity of one or more media server configurations formed using the one or more server configurations under consideration for supporting the expected workload 102. For instance, such evaluation 105 may identify a plurality of different homogeneous and/or heterogeneous media server configurations that are each capable of supporting workload 102 in accordance with the defined service parameters 104. For example, suppose that server configuration information 103A includes information for two different server configuration types, A and B, and cluster configuration information 103B includes information specifying that a weighted round-robin load balancing strategy is to be used for a cluster; in certain embodiments, capacity planner 101 outputs evaluation 105 identifying the following different media server configurations that are each capable of supporting a service provider's expected workload 102 in accordance with the defined service parameters 104: 1) a homogeneous cluster of 4 servers of configuration type A using the weighted round-robin load balancing strategy (e.g., with equal performance weighting assigned to each of the homogeneous nodes); 2) a homogeneous cluster of 5 servers of configuration type B using the weighted round-robin load balancing strategy (e.g., with equal performance weighting assigned to each of the homogeneous nodes); 3) and a heterogeneous cluster having 2 servers of configuration type A and 3 servers of configuration type B using the weighted round-robin load balancing strategy (e.g., with determined performance weighting assigned to the nodes of each configuration type). In certain embodiments, the capacity planner is operable to determine proper weighting for each node of a solution to be employed in a weighted load-balancing strategy, such as the weighted round-robin strategy of the above example. Further, in certain implementations, evaluation 105 may provide a comparison of the capacities of the various different media server configurations for supporting the expected workload 102, as well as the monetary cost of each media server configuration. From this information, a service provider may make an informed decision regarding the best media server configuration to be implemented for supporting the service provider's future workload. For instance, the service provider may, in certain implementations, determine the most cost-effective media server configuration, which may be a single server of a particular configuration type, a homogeneous cluster of servers of a particular configuration type that use a particular load balancing strategy, or a heterogeneous cluster of servers of different configuration types using a particular load balancing strategy for supporting the expected workload in a desired manner (i.e., in accordance with the service provider's specified service parameters 104).

For evaluating the capacity of a server configuration under the expected workload, certain embodiments provided herein use a "cost" function for evaluating the amount of resources of the server configuration that are consumed under the workload. That is, in certain embodiments capacity planner 101 is operable to compute a "cost" in terms of server resources consumed for supporting the workload. This cost function, which is described further below in conjunction with the example of FIG. 2, may provide a single value to reflect the combined resource requirement such as CPU, bandwidth, and memory to support a particular media stream depending on the stream bit rate and type of access (e.g., memory file access or disk file access). In general, this cost function is used to compute the cost (in terms of resources consumed) of serving a stream (request) depending on its type: 1) its encoding bit rate, and 2) its access type (memory versus disk). Capacity planner 101 can evaluate the computed cost of a given server configuration to evaluate whether the server configuration can support the workload in accordance with the service parameters 104.

The ability to plan and operate at the most cost effective capacity provides a desirable competitive advantage for many streaming media service providers. Consider, for example, a scenario where a service provider, supporting a busy media site, faces a necessity to migrate the site to a new, more efficient infrastructure. For example, it may be determined that the service provider's current media server configuration is unable to adequately support the service provider's regular workload, and thus a new media server configuration is desired. The challenge becomes determining the optimal or most cost-effective infrastructure for the service provider to implement. On the one hand, the service provider typically desires to implement a media server configuration that is capable of supporting the service provider's workload (at least for a majority of the time) such that a desired quality of service is maintained for the streams that it serves. However, the service provider also typically desires to minimize the monetary cost of the media server configuration. For instance, as mentioned above, in some situations the service provider may desire to continue making use of its existing equipment in the resulting solution (e.g., by adding additional nodes to the already existing nodes of a clustered media server). Thus, the service provider typically does not wish to select a media server configuration that will be capable of supporting the service provider's workload at a cost of $X dollars, while a media server configuration that costs much less would be capable of supporting the service provider's workload just (or almost) as well. The service provider traditionally has no tool for evaluating the manner in which each of the media server configurations being considered would support the service provider's expected workload. Thus, the service provider traditionally makes a relatively uninformed decision regarding which media server configuration to implement for supporting the service provider's site. For instance, the service provider traditionally makes a relatively uninformed decision regarding the capacity of a solution resulting from adding certain server node(s) to the service provider's already existing nodes.

Typically, the relationship between various media server configurations (e.g., either homogeneous or heterogeneous clustered solutions) and their respective abilities to support a service provider's workload is not fully understood or appreciated by the service provider, thereby making the decision of selecting a media server configuration difficult. For instance, service provider's traditionally have not had a tool for determining media server configuration(s) that is/are capable of supporting the service provider's expected workload in ia given manner (e.g., in accordance with certain service parameters defined by the service provider). Accordingly, a capacity planning tool, such as capacity planner 101 of FIG. 1, that is capable of evaluating media server configurations for a workload and provide feedback regarding the capacity of such configurations for supporting the workload and/or identifying the most cost-effective configuration is a beneficial tool for service providers. Particularly considering the great amount of flexibility and control that the various embodiments of capacity planner 101 described further herein provide to a service provider in, for example, defining desired service parameters with which a resulting media server configuration is to comply, the embodiments of capacity planner 101 described herein advantageously provide capacity planning assistance previously unavailable to a service provider.

Figures 2, 3:
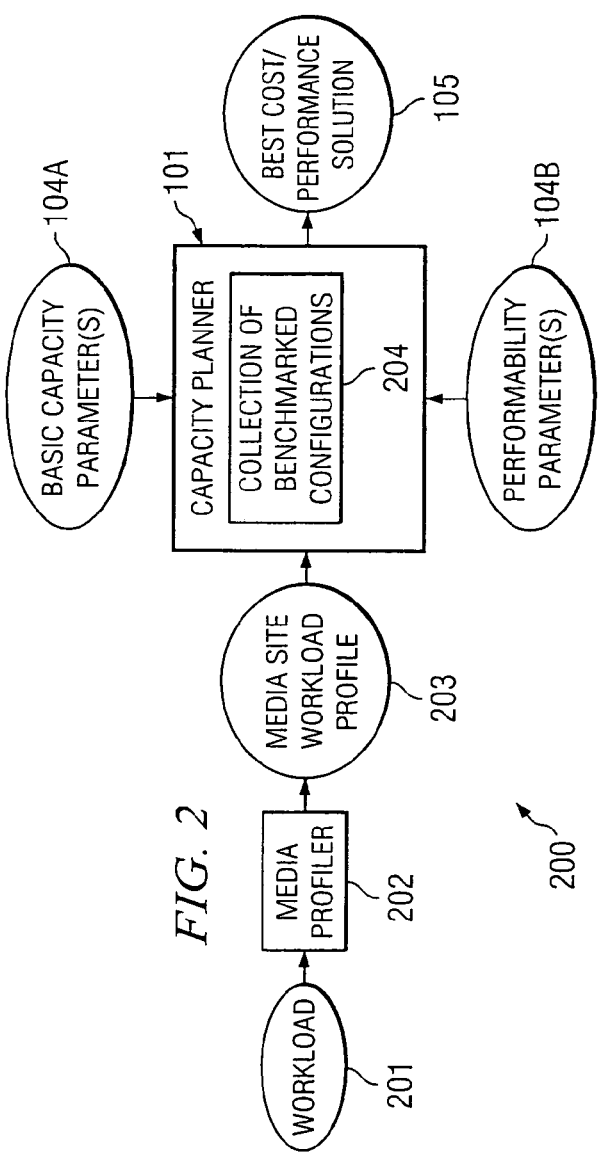
FIG. 2 shows a block diagram of another example embodiment of a capacity planning tool.
FIG. 3 shows one example of a workload profile that may be generated by a media profiler in accordance with one embodiment.

Turning to FIG. 2, a block diagram of another example embodiment of a capacity planning tool is shown. As with the example embodiment of FIG. 1, system 200 includes capacity planner 101, which may receive, as input, service parameters defining certain characteristics of the type of service desired to be provided by the service provider under the expected workload, such as Basic Capacity Parameters 104A and Performability Parameters 104B.

In the example of FIG. 2, a media profiler 202 (referred to herein as "MediaProf") is implemented. Such MediaProf 202 receives workload information 201 and generates a workload profile 203 for the service provider's workload. As mentioned above, media service providers typically collect media server access logs, which reflect processed client requests and client activities at the service provider's site. In the example of FIG. 2, workload 201 comprises such an access log (which may be from a single server or from a cluster of servers at the service provider's site, depending on the service provider's current media server configuration) for an elapsed period of say, 3 months to a year. The access log may include information for any suitable elapsed period of time that is sufficiently long to provide a representative "view" of the service provider's regular (or typical) workload. Alternatively, workload 201 may be a synthetic or estimated workload that is representative of the workload expected for the service provider's site.

MediaProf 202 receives this workload information (e.g., access log) 201 and processes such workload information 201 to generate a workload profile 203 for the service provider. Such workload profile 203 is then received by capacity planner 101 and used thereby for evaluating one or more server configurations under consideration. In certain implementations, MediaProf 202 processes the access log collected for a service provider's site to characterize the site's access profile and its system resource usage in both a quantitative and qualitative way in the workload profile 203. Examples of workload profile 203 that may be generated by MediaProf 202 according to certain implementations are described further below in conjunction with FIGS. 3 and 4. As described further with FIGS. 3 and 4, in certain embodiments workload profile 203 identifies the access types of requests (e.g., memory versus disk) in the workload for a given server configuration under consideration. Thus, MediaProf 202 may generate a different workload profile 203 for different server configurations (e.g., having different memory sizes) for the given workload 201.

As described further below with FIG. 8A, a dispatcher may be used to dispatch the requests from workload 201 (e.g., the access log) to each server of a given media server configuration in accordance with a specified load balancing technique, and MediaProf 202 determines a workload profile for each of the servers in the media server configuration under evaluation. For example, suppose a media server configuration having 3 nodes of configuration "A" and 2 nodes of configuration "B" is under evaluation, a dispatcher dispatches requests of the workload 201 to each of the 5 nodes of the media server configuration in accordance with a specified load balancing technique (e.g., weighted round-robin, etc.). Thus, a corresponding sub-workload is dispatched to each of the 5 nodes. Given the requests included in the respective sub-workloads dispatched to each of the 5 nodes, MediaProf 202 determines a sub-workload profile for each of such 5 nodes. The sub-workload profiles for the servers of like types are then merged to form a workload profile for each server type. For instance, the sub-workload profiles for the 3 nodes of configuration A are merged to form a workload profile for the servers of type A, and the sub-workload profiles for the 2 nodes of configuration B are merged to form a workload profile for the servers of type B. Capacity planner 101 receives the workload profiles of each server type and uses these profiles for evaluating the capacity of this 5-node heterogeneous media server configuration for supporting the expected workload 201 of the service provider's site.

As further described herein, the workload profile(s) are utilized in certain embodiments for performing "interval analysis." For instance, a given interval of time (e.g., 10 minutes, 30 minutes, 1 hour) may be specified and such interval may be evaluated throughout the workload profile(s) to determine the capacity of a media server configuration under evaluation for supporting the workload during such interval. For example, windows of 1 hour intervals that are spaced 1 minute apart (and are thus overlapping) in the workload profile(s) may each be evaluated to determine whether the media server configuration under evaluation services such interval of workload in accordance with defined service parameters 104 (e.g., performability parameters 104B). Thus, a determination can be made whether any 1-hour interval of the workload profile fails to comply with the specified service parameters 104.

In the example embodiment of FIG. 2, capacity planner 101 has the ability to measure and to compare the capacities of different media server configurations. More specifically, in this example embodiment capacity planner 01 uses a cost function for evaluating the capacities of various different server configurations under the workload. As mentioned above, a technique for measuring server capacity using a cost function is disclosed in the '279 application. Also, a technique for measuring server capacity using a cost function is described by L. Cherkasova and L. Staley in "Building a Performance Model of Streaming Media Applications in Utility Data Center Environment", *Proc. of ACM/IEEE Conference on Cluster Computing and the Grid (CCGrid)*, May, 2003 (hereinafter referred to as "the L. Cherkasova Paper"), the disclosure of which is hereby incorporated herein by reference. The above references introduce a basic benchmark that can be used to establish the scaling rules for server capacity when multiple media streams are encoded at different bit rates. For instance, a basic benchmark may be executed for each of various different encoding bit rates for files stored at a media server.

A media server (which may be either a single server or a cluster of servers) may comprise streaming media files that are encoded for transmission at each of a plurality of different bit rates. For example, a first streaming media file, "File A," may comprise a particular content and it may be encoded for transmission at a plurality of different bit rates, such as 28 Kb/s, 56 Kb/s, and/or various other bit rates. Each resulting version of the file encoded for transmission at a given bit rate may be stored to data storage of the media server and the media server may be able to serve the appropriate one of such files as a stream to a client. In this case, the different encoded files comprise substantially the same content (i.e., the content of File A), but are encoded for transmission at different bit rates, and thus the quality of each file may differ. A media server generally attempts to serve the most appropriate encoded file to a client based at least in part on the client's access speed to the client-server network. For example, suppose a first client has a 28 Kb/s speed connection to the communication network (e.g., the Internet), a second client has a 56 Kb/s speed connection to the communication network, and a media server comprises File $A_1$ encoded at 28 Kb/s and File $A_2$ encoded at 56 Kb/s stored thereto; when the first client requests the content of File A, the media server typically attempts to serve File $A_1$ to this first client (as File $A_1$ is the highest-quality encoded file supportable by the first client's connection speed), and when the second client requests the content of File A, the media server typically attempts to serve File $A_2$ to this second client (as File $A_2$ is the highest-quality encoded file supportable by the second client's connection speed).

As used herein, a file encoded for transmission at a particular bit rate may be referred to as a file encoded at the particular bit rate. In common phraseology in the art, a streaming media file is referred to as being "encoded at a particular bit rate", which means the file is encoded for transmission from the server at the particular bit rate. Thus, as used herein, the phrase "encoded at a bit rate" when describing a streaming media file means the streaming media file is encoded for transmission at the bit rate, as is consistent with common phraseology in the streaming media art.

As shown in the example of FIG. 2, capacity planner 101 may have stored thereto (e.g., to a data storage device, such as random access memory (RAM), hard disk, optical disk drive, etc., which is communicatively accessible by capacity planner 101) server configuration information 204, such as server configuration information 103A in the example of FIG. 1. Although not specifically shown in FIG. 2, capacity planner 101 may also include cluster configuration information 103B of FIG. 1. In this example, server configuration information 204 includes benchmark information for various different server configurations, such as the benchmark information described in the '279 application. An objective of the basic benchmark according to one embodiment is to define how many concurrent streams of the same bit rate can be supported by the corresponding server configuration without degrading the quality of any streams.

In accordance with one embodiment, the basic benchmark comprises two types of benchmarks:
1) Single File Benchmark measuring a media server capacity when all the clients in the test workload are accessing the same file, and
2) Unique Files Benchmark measuring a media server capacity when each client in the test workload is accessing a different file.

Each of these benchmarks have a set of sub-benchmarks with media content encoded at a different bit rate. In one performance study that we have conducted, the following six bit rates that represent the typical Internet audience were used: 28 Kb/s, 56 Kb/s, 112 Kb/s, 256 Kb/s, 350 Kb/s, and 500 Kb/s. Of course, the set of benchmarked encoding bit rates can be customized according to a targeted workload profile, and thus other encoding bit rates instead of or in addition to those of our performance study may be used in various embodiments.

Thus, a Single File Benchmark (SFB) may be executed for each of various different encoding bit rates for files stored at a server configuration under evaluation. The SFB measures the server capacity when all of the clients in the test are accessing the same file. That is, the result of the SFB for a particular encoding bit rate defines the maximum number of concurrent streams of a single file encoded at that particular bit rate that the corresponding server configuration can support. Example techniques for executing SFBs for a media server are described further in the '279 application. In this example embodiment of FIG. 2, an SFB is determined for each of various different server configurations, and such SFB determined for each server configuration is included in the collection of benchmarks 204.

Similarly, a Unique Files Benchmark (UFB) may be executed for each of various different encoding bit rates for files stored at a server configuration under evaluation. The UFB measures the server capacity when all of the clients in the test are accessing different files. That is, the result of a UFB for a particular encoding bit rate defines the maximum number of concurrent streams, each of different files that are encoded at the particular bit rate, that the corresponding server configuration can support. Example techniques for executing UFBs for a media server are described further in the '279 application. In an example embodiment of FIG. 2, a UFB is determined for each of various different server configurations, and such UFB determined for each server configuration is included in the collection of benchmarks 204.

When all of a media server's clients are accessing a single file (as measured by the SFB), the media server is capable of serving the currently streamed bytes of the file from memory.

However, when all of its clients are accessing a different file (as measured by the UFB), the media server serves each file from disk. Thus, the SFB is essentially a best-case scenario benchmark, whereas the UFB is essentially a worst-case scenario benchmark for a corresponding server configuration under consideration.

Using an experimental testbed with standard components available in a Utility Data Center environment and proposed set of basic benchmarks, the capacity and scaling rules of a media server running RealServer 8.0 from RealNetworks was measured in the L. Cherkasova Paper. The measurement results reported in the L. Cherkasova Paper show that these scaling rules are non-trivial. For example, the difference between the highest and lowest bit rate of media streams used in those experiments was 18 times. However, the difference in maximum number of concurrent streams a server is capable of supporting for corresponding bit rates is only around 9 times for an SFB, and 10 times for a UFB. Modern media servers, such as RealServer 8.0, rely on the native operating system's file buffer cache support to achieve higher application throughput when accessed files are streamed from memory. The measurements indicate that media server performance is approximately 3 times higher (and for some disk/file subsystems, up to 7 times higher) under the SFB than under the UFB. This quantifies the performance benefits for multimedia applications when media streams are delivered from memory versus from disk.

Capacity planner 101 uses the benchmarks for the various different server configurations to evaluate those server configurations under the received workload information (e.g., the workload profile 203). For evaluating the capacity of a server configuration under the expected workload, certain embodiments of a capacity planner use a "cost" function for evaluating the amount of resources of the corresponding server configuration under consideration that are consumed under the workload. As described in the '279 application and in the L. Cherkasova Paper, a set of basic benchmark measurements for a server configuration may be used to derive a cost function that defines a fraction of system resources of such media server configuration that are needed to support a particular media stream depending on the stream bit rate and type of access (memory file access or disk file access), including the following costs:

A)

$$cost_{X_i}^{disk}$$

—a value of cost function for a stream with disk access to a file encoded at $X_i$ Kb/s. If we define the server configuration capacity being equal to 1, the cost function is computed as $$cost_{X_i}^{disk} = 1 / N_{X_i}^{Unique}, \text{ where } N_{X_i}^{Unique}$$

is the maximum measured server capacity in concurrent streams under the UFB of the corresponding server configuration under consideration for a file encoded at $X_i$ Kb/s; and

B)

$$cost_{X_i}^{memory}$$

—a value of cost function for a stream with memory access to a file encoded at $X_i$ Kb/s. Let $$N_{X_i}^{Single}$$

be the maximum measured server capacity in concurrent streams under the SFB of the corresponding server configuration under consideration for a file encoded at $X_i$ Kb/s, then the cost function is computed as $$cost_{X_i}^{memory} = \frac{(N_{X_i}^{Unique} - 1)}{(N_{X_i}^{Unique} \times (N_{X_i}^{Single} - 1))}.$$

Let W be the current workload processed by a media server, where
a) $X_w = X_1, \ldots X_{k_w}$ is a set of distinct encoding bit rates of the files appearing in W ($X_w \subseteq X$);
b)

$$N_{X_{W_i}}^{memory}$$

is a number of streams having a memory access type for a subset of files encoded at $X_{W_i}$ Kb/s; and
c)

$$N_{X_{W_i}}^{disk}$$

is a number of streams having a disk access type for a subset of files encoded at $X_{W_i}$ Kb/s.

Then, the service demand, "Demand," to a server under workload W can be computed by the following capacity equation:

$$\text{Demand} = \sum_{i=1}^{K_W} N_{X_{W_i}}^{memory} \times cost_{X_{W_i}}^{memory} + \sum_{i=1}^{K_W} N_{X_{W_i}}^{disk} \times cost_{X_{W_i}}^{disk} \qquad (1)$$

If Demand$\leq$1 then a single-server configuration of the media server operates within its capacity, and the difference 1-Demand defines the amount of available server capacity. On the other hand, if Demand>1 then the single-server configuration of the media server is overloaded and its capacity is exceeded. For example, when the computed service demand is Demand=4.5, this indicates that the considered workload (media traffic) requires 5 nodes (of the corresponding server configuration) to be supported in the desired manner. In accordance with certain embodiments, media site workload profile(s) 203 and cost functions of different media server configurations may be used by capacity planner 101 for computing the service demand, Demand, using the capacity equation (1) above, and the computed results may be compared (by capacity planner 101 and/or by a service provider) to choose the best cost/performance configuration.

As described further below, in certain embodiments, an iterative approach is used by capacity planner 101 for determining media server configuration(s) that are capable of supporting the workload in a desired manner. For instance, capacity planner 101 may first use the benchmarks (SFB and UFB) and cost function for each server configuration included in a cluster under evaluation to compute the Demand for each server configuration (using the corresponding benchmarks and cost function for each respective server configuration). If the Demand indicates that more than one of the servers of the corresponding configuration type is required for supporting the expected workload, capacity planner 101 then re-evaluates the expected workload for a clustered media server configuration having the number of servers of that type as indicated by the Demand. For instance, if when evaluating the capacity of a heterogeneous clustered media server that includes a single server of a first configuration type the capacity planner computes the demand for such first configuration type of server included in the cluster as Demand=4.5 (indicating that a cluster of 5 nodes of such server configuration type is needed for supporting its allocated portion of the expected workload), capacity planner 101 re-evaluates the capacity of a clustered media server having the resources (e.g., amount of memory, etc.) of 5 of the servers of this first configuration type (in addition to any other nodes of other configuration types included in the cluster under evaluation).

Capacity planner 101 then determines the media site workload profile(s) 203 for each type of server included in the heterogeneous cluster (because the workload profile(s) 203 for the servers may differ from the workload profile(s) 203 initially determined), and capacity planner 101 uses such determined workload profile(s) 203 for each of the server configurations to compute the Demand for each server configuration. If the Demand computed for the first server configuration again indicates that 5 servers of that configuration type are needed in the heterogeneous cluster (as well as again indicating that the initially determined number of servers of each other type of server in the heterogeneous cluster), capacity planner 101 concludes that such a cluster of 5 nodes is the proper solution for supporting the expected workload. This iterative process is described further in the '273 application for determining a proper number of servers of a given server configuration, which may be extended in accordance with the embodiments herein to iteratively determine/verify the number of servers to be included in each of a plurality of different server configurations implemented in a heterogeneous cluster under evaluation.

The above-described cost function uses a single value to reflect the combined resource requirement such as CPU, bandwidth and memory to support a particular media stream depending on the stream bit rate and type of the file access (memory or disk access). The proposed framework provides a convenient mapping of a service demand (client requests) into the corresponding system resource requirements.

As mentioned with FIG. 2, workload profile(s) 203 based on the past workload history (e.g., access log) 201 of a service provider may be generated by MediaProf 202 and used by capacity planner 101 in evaluating the capacity of one or more server configurations for supporting the service provider's workload. While it may be useful to understand how much traffic is serviced by the site in a particular time interval (e.g., per hour), this knowledge does not translate directly into capacity requirements for a proper media server configuration. For properly evaluating a media server configuration's capacity for supporting a workload, information concerning the number of simultaneous (concurrent) connections and the corresponding peak bandwidth requirements may be used by capacity planner 101.

As described further in the '273 application, in the workload of many sites the amount of client requests and required bandwidth is highly variable over time, and such traffic is often "bursty" such that a large fraction of requests can be served from memory. Since a media server capacity is 3-7 times higher when media streams are delivered from memory versus from disk, such a qualitative media traffic classification and analysis directly translates in significant configuration savings.

In general, in accordance with at least one embodiment, MediaProf 202 processes the workload 201 (e.g., media server access logs) to generate workload profile(s) 203 by: a) evaluating the number of concurrent connections at each moment of time, b) partitioning the concurrent connections into a predefined set of bit rate groups, and c) classifying the concurrent connections by the file access type: memory versus disk. Operation of MediaProf 202 and the resulting workload profile(s) 203 of certain embodiments of the capacity planning tool are described further below.

Since the amount of system resources needed to support a particular client request depends on the file encoding bit rate as well as the access type of the corresponding request (i.e. different requests have a different resource "cost" as described above), MediaProf 202 provides a corresponding classification of simultaneous connections in the generated workload profile(s) 203. FIG. 3 shows a first example workload profile 203 that may be generated by certain embodiments of MediaProf 202. As shown, the example workload profile 203 of FIG. 3 includes various points in time for which access information was collected in the access log of workload 201, such as time $T_1$. For each time point, the number of concurrent connections is identified. More specifically, the number of concurrent connections are categorized into corresponding encoding bit rates for the streaming media files accessed thereby. Further, the number of concurrent connections in each encoding bit rate category is further categorized into sub-categories of either memory or disk depending on whether the access was a memory access or a disk access. That is, MediaProf 202 may model whether a request in the workload can be serviced from memory or from disk for a given server configuration (e.g., a given memory size). As described further herein, the profile for each server type included in a clustered media server may be built by MediaProf 202 based on the requests of workload 201 that are directed to node(s) of each server type according to a specified load balancing strategy (e.g., weighted round-robin, etc.). Thus, for the requests of the workload 201 that are directed to a given server (or "node") of a clustered media server configuration under evaluation, MediaProf 202 models whether each request to such given server can be serviced from memory or from disk. For instance, the memory modeling technique disclosed in co-pending and commonly assigned U.S. patent application Ser. No. 10/601,956 (hereafter "the '956 application") titled "SYSTEM AND METHOD FOR MODELING THE MEMORY STATE OF A STREAMING MEDIA SERVER," now U.S. Pat. No. 7,310,681, may be used in certain embodiments. In certain implementations, MediaProf 202 may build different profiles for different memory sizes (e.g., different profiles 203 are constructed for different media server configurations that have different memory sizes). Note that a memory access does not assume or require that the whole file resides in memory. For example, if there is a sequence of accesses to the same file issued closely to each other on a time scale, then the first access may read a file from disk, while the subsequent requests may be accessing the corresponding file prefix from memory. A technique that may be used by MediaProf 202 in determining whether an access is from memory or from disk is described further below in conjunction with FIG. 5.

In the example workload profile of FIG. 3, 30 concurrent connections (or client accesses) are in progress at time $T_1$ for the media site under consideration. The 30 concurrent connections are categorized into 3 accesses of media file(s) encoded at 28 Kb/s, 2 accesses of media file(s) encoded at 56 Kb/s, 3 accesses of media file(s) encoded at 112 Kb/s, 7 accesses of media file(s) encoded at 256 Kb/s, 5 accesses of media file(s) encoded at 350 Kb/s, and 10 accesses of media file(s) encoded at 500 Kb/s. Again, embodiments are not limited to the six encoding bit rate categories of the example of FIG. 3, but rather other encoding bit rates may be used instead of or in addition to those of FIG. 3 (e.g., as may be tailored for the service provider's site/workload). Further, the 3 accesses of media file(s) encoded at 28 Kb/s are further sub-categorized into 2 memory accesses and 1 disk access. The 2 accesses of media file(s) encoded at 56 Kb/s are further sub-categorized into 0 memory accesses and 2 disk accesses. The 3 accesses of media file(s) encoded at 112 Kb/s are further sub-categorized into 3 memory accesses and 0 disk accesses. The 7 accesses of media file(s) encoded at 256 Kb/s are further sub-categorized into 6 memory accesses and 1 disk access. The 5 accesses of media file(s) encoded at 350 Kb/s are further sub-categorized into 5 memory accesses and 0 disk accesses, and the 10 accesses of media file(s) encoded at 500 Kb/s are further sub-categorized into 8 memory accesses and 2 disk accesses.

Figures 4, 5:
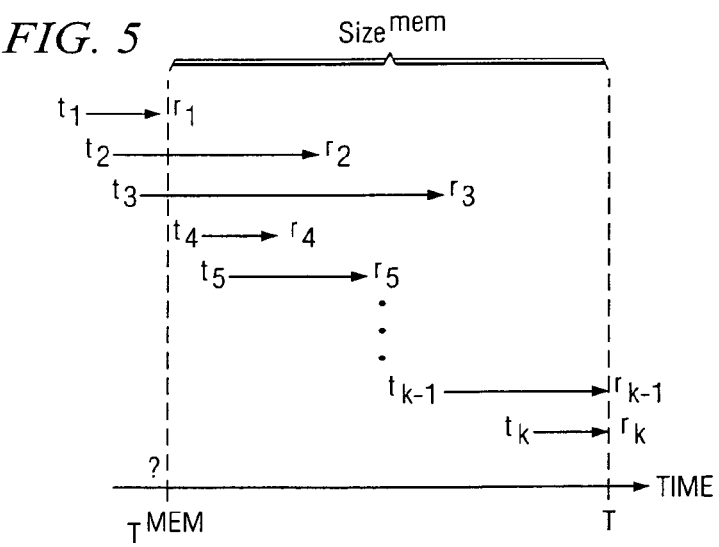
FIG. 4 shows another example of a workload profile that may be generated by a media profiler in accordance with one embodiment.
FIG. 5 shows an example of requests for file accesses that are made to a media server during an interval of time.

Another example workload profile 203 that may be generated by certain embodiments of MediaProf 202 is shown in FIG. 4. As shown, the example workload profile 203 of FIG. 4 includes various points in time for which access information was collected in the access log of workload 201, such as timestamps $t_i-1$, $t_i$, and $t_i+1$. In this example, the timestamps show when the media server state changes, e.g., i) the media server accepts a new client request (or multiple new requests) or ii) some active media sessions are terminated by the clients. For each timestamp, the number of concurrent connections is identified. In the example of FIG. 4, there are 100 concurrent connections at timestamp $t_i-1$, 104 concurrent connections at timestamp $t_i$, and 103 concurrent connections at timestamp $t_i+1$. As with the example of FIG. 3, the number of concurrent connections are categorized into corresponding encoding bit rates for the streaming media files accessed thereby. In the example of FIG. 4, the number of the concurrent connections at any given timestamp are categorized into those connections that are accessing streaming media files encoded at less than 56 Kb/s, those that are accessing streaming media files encoded at a rate from 56 Kb/s to 112 Kb/s, and those that are accessing streaming media files encoded at greater than 112 Kb/s.

For each of these categories, the connections are further categorized into sub-categories of either memory or disk depending on whether the access was a memory access or a disk access. As described above, MediaProf 202 may model whether a request in the workload can be serviced from memory or from disk for a given server configuration (e.g., a given memory size), such as with the memory modeling technique disclosed in the '956 application. A technique that may be used by MediaProf 202 in determining whether an access is from memory or from disk is described further below in conjunction with FIG. 5.

Turning to FIG. 5, an example technique for MediaProf 202 determining an access type (i.e., whether memory or disk access) is now described. Let $Size^{mem}$ be the size of memory in bytes of a server configuration under consideration. For each request r in the media server access log of workload 201, information is included about the media file requested by r, the duration of r in seconds, the encoding bit rate of the media file requested by r, the time t when a stream corresponding to request r is started (which is reflected by r(t) herein), and the time when a stream initiated by request r is terminated.

Let $r_1(t_1)$, $r_2(t_2)$, ..., $r_k(t_k)$ be a recorded sequence of requests to a given server configuration (e.g., $S_1$). Given the current time T and request r(T) to media file f MediaProf 202 may compute some past time $T^{mem}$ such that the sum of the bytes stored in memory between $T^{mem}$ and T is equal to $Size^{mem}$. Accordingly, the files' segments streamed by the server configuration between times $T^{mem}$ and T will be in memory at time T. In this way, MediaProf 202 can identify whether request r will stream file f (or some portion of it) from memory for the given server configuration under consideration.

In the specific example shown in FIG. 5, requests for file accesses that are made to the server configuration (e.g., $S_1$) during the interval of time $t_1$ through time T is shown, wherein the interval from time $T^{mem}$ through time T can be determined that comprises the segments of accessed files that are currently stored to the server's memory, which has size $Size^{mem}$. More specifically, accesses $r_1, r_2, \ldots, r_{k-1}, r_k$ are made during the time interval from time $t_1$ through the current time T.

As described further below, when a clustered media server configuration is considered, a dispatcher determines the requests of workload 201 that will be directed to each server of the cluster (in accordance with a load balancing strategy employed by the cluster, such as a weighted round robin strategy), and considering memory size, $Size^{mem}$, of each server of the cluster, a determination is made whether each access is a memory type or a disk type. That is, the memory of each server in the cluster may be modeled in the manner described in connection with FIG. 5 to determine the corresponding access types (memory versus disk) for the requests of workload 201 that are serviced by each server of the cluster. As shown in the example of FIG. 5, the total size of the segments accessed is greater than the total size, $Size^{mem}$, of the server's memory. Thus, depending on the type of memory management scheme implemented for the memory, some of the accessed segments are evicted from the memory. That is, not all of the accessed segments can be stored to memory because the segments' total size is greater than size $Size^{mem}$ of memory of the server configuration under consideration. Typically, a Least Recently Used (LRU) scheme is implemented for a media server, wherein the most recently accessed segments are stored to memory and the oldest (or least recently accessed) segments are evicted to make room for more recently accessed segments to be stored in memory. To determine the current contents of memory at time T, the time interval from time $T^{mem}$ to the time T in which unique file segments that have a size totaling size $Size^{mem}$ is determined by MediaProf 202 from the workload information 201.

The '956 application further describes an example technique for modeling the memory state of a streaming media server, and such memory modeling technique may be employed by MediaProf 202 in certain embodiments for efficiently determining the memory state of the server configuration(s) under consideration. That is, MediaProf 202 may use such memory modeling technique for modeling accesses of the workload 201 for each server configuration under consideration to generate a workload profile 203, such as the example workload profile of FIG. 3 or FIG. 4, for each type of server configuration under consideration.

As described further in the '273 application and '556 Application, in certain implementations, MediaProf 202 may build different profiles for different memory sizes (e.g., different profiles 203 are constructed for different server configurations that have different memory sizes). For example, a first media workload profile $MP_1$ may be generated for a server configuration $S_1$ (having a first memory size), a second media workload profile $MP_2$ may be generated for a server configuration $S_2$ (having a different memory size), and so on. In this way, MediaProf 202 allows evaluation of performance benefits of systems with different memory sizes when processing a particular workload.

In the example embodiment of FIG. 2, capacity planner 101 has a collection of benchmarked configurations 204 with the corresponding cost functions for different types of requests (i.e., requests serviced by memory versus requests serviced by disk). Capacity planner 101 receives the media site workload profile(s) 203 (for each of the server configurations included in the media server cluster under evaluation) and, using the corresponding cost functions of each of the server configurations, computes a corresponding service demand profile over time according to capacity equation (1) above. In certain embodiments, the service demand profile is computed for different memory sizes and different benchmarked configurations to enable capacity planner 101 to evaluate the capacity of a plurality of different media server configurations for supporting the expected workload. In certain embodiments, a service demand profile is computed for each of the types of server configurations (e.g., $S_1$, $S_2$, $S_3$, etc.) included in the clustered media server under evaluation. Examples of such a service demand profile that may be generated are described further in the '273 application and in the '556 Application.

Figure 6:
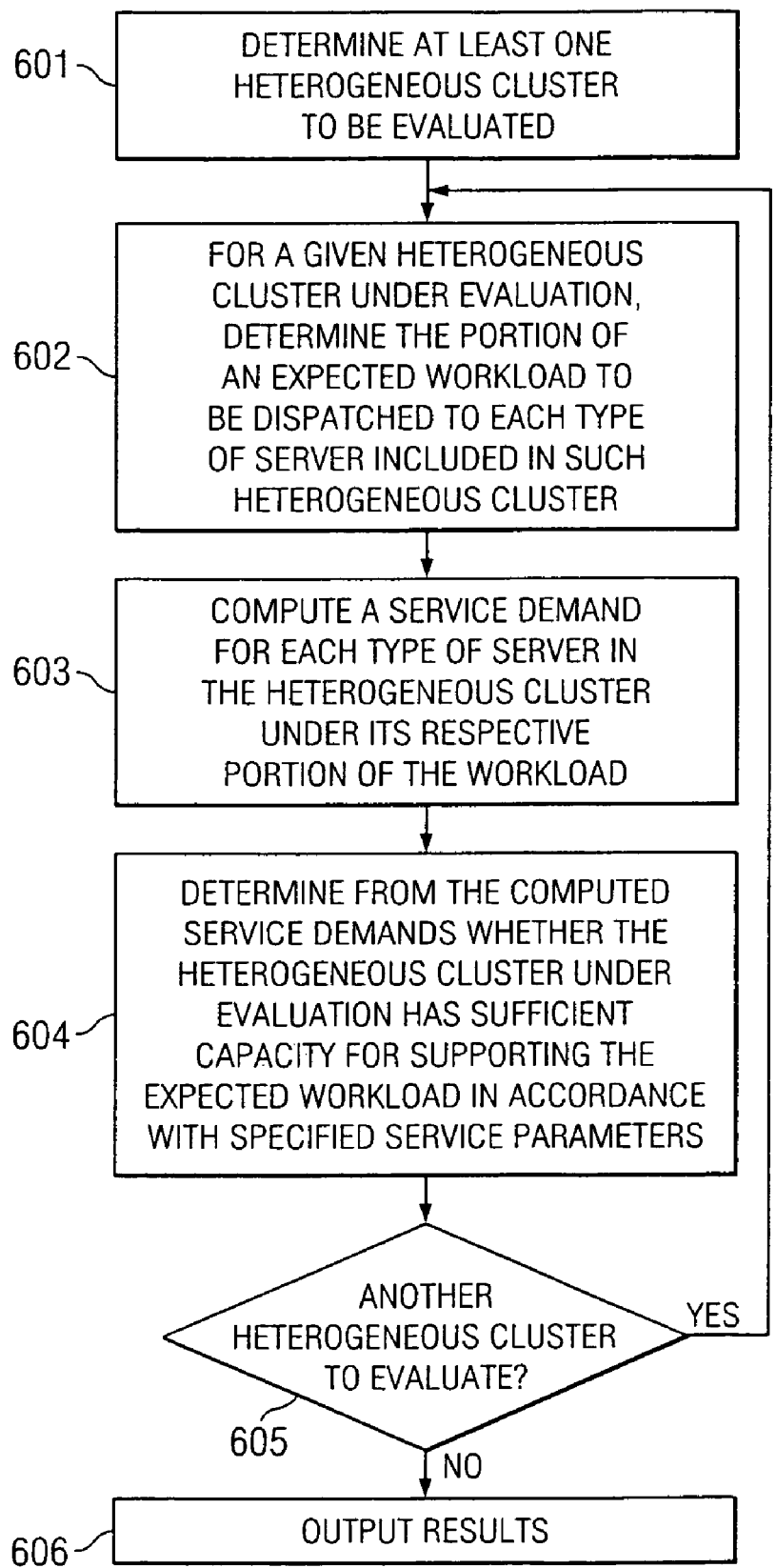
FIG. 6 shows an operational flow diagram for certain embodiments of a capacity planning tool that is operable to evaluate capacity of a heterogeneous cluster.

FIG. 6 shows an operational flow diagram for certain embodiments of a capacity planning tool that is operable to evaluate capacity of a heterogeneous cluster. In operational block 601 at least one heterogeneous cluster to be evaluated is determined. That is, a combination of different types of server configurations arranged in a cluster is determined. As described further herein, such heterogeneous cluster(s) to be evaluated may be determined in a number of different ways. For instance, a user may input specific heterogeneous cluster (s) to be evaluated. That is, a user may specify a specific combination of different types of server configurations (e.g., 5 nodes of server type $S_1$, 8 nodes of server type $S_2$, etc.) to form the heterogeneous cluster to be evaluated.

As another example, the user may specify a finite number of each of a plurality of different types of servers that are available for use in forming a heterogeneous cluster, and the capacity planning tool may determine various combinations of such available servers and evaluate the capacity of each combination to determine those combination(s), if any, that support the expected workload in a desired manner (e.g., in accordance with specified service parameters). For instance, a user may specify that 10 nodes of server type $S_1$, 15 nodes of server type $S_2$, and 7 nodes of server type $S_3$ are available for use in forming a clustered media server solution, and the capacity planning tool determines various combinations of such available servers to evaluate.

As still another example, a finite number of each server configuration type may not be supplied by a user, but instead an upper limit of the number of each server configuration type that may be required is determined by the capacity planning tool by determining a homogeneous solution for each server configuration type. For instance, a determination can be made as to the number of $S_1$ servers to be included in a homogeneous clustered media server for supporting the expected workload in a desired manner, the number of $S_2$ servers to be included in a homogeneous clustered media server for supporting the expected workload in a desired manner, and the number of $S_3$ servers to be included in a homogeneous clustered media server for supporting the expected workload in a desired manner. The determined homogeneous solution for each server type provides an upper bound of the number nodes of each server type that may be required for supporting the expected workload in a desired manner. Various heterogeneous clusters may be determined using combinations of the number of nodes of each type up to their respective upper bounds. For example, a first heterogeneous mix of such servers $S_1$, $S_2$, and $S_3$ that is capable of supporting the expected workload in a desired manner may be formed having the number of each server type of its respective homogeneous solution, and this heterogeneous mix may be gradually reduced to determine a various other heterogeneous clusters to be evaluated.

As yet another example, a service provider may specify an existing cluster of nodes of at least a first type (e.g., 10 nodes of server $S_1$) that the service provider has, and the service provider may identify various additional server types to be considered for being added to the existing cluster. For instance, suppose the service provider has an existing cluster of 10 nodes of server $S_1$ and desires to increase the capacity of this cluster by adding to this cluster additional servers of types $S_1$, $S_2$, and/or $S_3$. Various heterogeneous clusters may be determined by the capacity planning tool (e.g., by gradually adding servers of types $S_2$ and/or $S_3$ to the existing cluster).

Any other technique for determining at least one heterogeneous cluster to be evaluated that is now known or later discovered may be employed with the embodiments of the capacity planning tool described herein. In operational block 602, for a given heterogeneous cluster under evaluation, the portion of an expected workload to be dispatched to each type of server included in the heterogeneous cluster is determined. As described further herein, in certain embodiments, a weighted load balancing strategy (e.g., weighted round-robin) may be determined and such strategy used for determining how the requests of the expected workload would be allocated among the various nodes of the heterogeneous cluster. As also described herein, in certain embodiments, the portion of the expected workload allocated to each type of server in the heterogeneous cluster are used (by MediaProf 202) to generate a workload profile for each server type (such as workload profiles 203 described above with FIGS. 3 and 4).

In operational block 603, the capacity planner computes a service Demand for each type of server in the heterogeneous cluster under evaluation based on the respective portion of the expected workload allocated to each server type. As mentioned above, in certain embodiments, the workload profile of each type of server configuration is processed to determine a service demand profile, which can be used to determine if the server configuration complies with the service parameters 104 specified by a service provider. As described further herein, the computed service Demand identifies the number of servers of the corresponding configuration type that are needed to support its allocated portion of the workload in a desired manner (e.g., in accordance with the service parameters 104). As described further herein, this evaluation may be performed not only for Basic Capacity Parameters 104A, but also taking into consideration Performability Parameters 104B.

In operational block 604, the capacity planner determines from the computed service Demands whether the heterogeneous cluster under evaluation has sufficient capacity for supporting the expected workload in accordance with specified service parameters. In certain implementations, such as the example operational flow of FIG. 7 below, if the heterogeneous cluster under evaluation is determined as not having sufficient capacity for supporting the expected workload, the computed service Demands are used to determine a heterogeneous cluster of the server configuration types under evaluation that does have sufficient capacity for supporting the expected workload in accordance with the specified service parameters 104.

In operational block 605, the capacity planning tool determines whether it is to evaluate another heterogeneous cluster, and if so, then operation returns to block 602 to repeat operations 602, 603, and 604 for the next heterogeneous cluster to be evaluated. Otherwise, the capacity planning tool may output its results (e.g., indication, for each heterogeneous cluster evaluated, whether such heterogeneous cluster has sufficient capacity for supporting the expected workload) in block 606.

Turning to FIG. 7, another example operational flow diagram for certain embodiments of a capacity planning tool is shown. Again, at least one heterogeneous cluster to be evaluated is determined in block 701. As described above, such heterogeneous cluster(s) to be evaluated may be determined in a number of different ways. As with operational block 602 described above with FIG. 6, in operational block 702, for a given heterogeneous cluster under evaluation, the portion of an expected workload to be dispatched to each type of server included in the heterogeneous cluster is determined. Also, as with operational block 603 described above with FIG. 6, the capacity planner computes, in block 703, a service Demand for each type of server in the heterogeneous cluster under evaluation based on the respective portion of the expected workload allocated to each server type.

In operational block 704, the capacity planner determines from the computed service Demands the number of servers (nodes) of each configuration type that are needed to support its allocated portion of the workload in a desired manner (e.g., in accordance with the service parameters 104). As described further herein, this evaluation may be performed not only for Basic Capacity Parameters 104A, but also taking into consideration Performability Parameters 104B. In operational block 705, the capacity planner determines whether the number of nodes determined in block 704 for each type of server configuration match the number of nodes of each type of server configuration included in the heterogeneous cluster under evaluation. If the number of nodes determined in block 704 for each type of server configuration match the number of nodes of each type of server included in the heterogeneous cluster under evaluation, then the cluster under evaluation is determined, in block 706, as a possible solution that is capable of supporting the expected workload in accordance with the specified service parameters 104.

On the other hand, if the number of servers of at least one type of server configuration determined in block 704 do not match the number of servers of the corresponding type of server configuration included in the heterogeneous cluster under evaluation, then, in operational block 707, a new heterogeneous cluster having the determined number of nodes (from block 704) of each server configuration type is created and the new heterogeneous cluster is evaluated to verify that it has sufficient capacity for supporting the expected workload as desired. For instance, suppose the heterogeneous cluster under evaluation includes a single server of configuration type "A" therein, and suppose that when evaluating the capacity of this single server configuration type A the capacity planner determines its Demand=4.5 (indicating that a cluster of 5 nodes of such server configuration type A is needed for supporting its allocated portion of the expected workload). In this instance, the capacity planner may re-evaluate the capacity of the heterogeneous clustered media server to include the resources (e.g., amount of memory, etc.) of 5 of the servers of the configuration type A. For instance, the capacity planner may again determine the proper weighted load balancing strategy to employ and the media site workload profile(s) 203 for such a heterogeneous clustered media server (because the workload profile(s) 203 for the clustered media server may differ from the workload profile(s) 203 initially determined for the cluster that included a single server of configuration type A, and capacity planner uses such determined workload profile(s) for this new heterogeneous media cluster (that includes 5 nodes of configuration type A) to re-compute the Demand for each configuration type. The computed Demand for each configuration type is again evaluated (as in block 705) to determine if it matches the number of servers of each configuration type in the heterogeneous cluster under evaluation. The above iterative process may be repeated until a proper number of servers of each configuration type to be included in the heterogeneous cluster is determined.

In certain embodiments, the capacity planner may determine a solution for each possible combination of types of servers under consideration. For instance, Table 1 below shows an example of all possible combinations of types of servers $S_1$, $S_2$, and $S_3$ that may be implemented in a clustered solution, where a "1" in the table represents that at least one node of the corresponding type of server is present in the cluster and a "0" in table represents that no node of the corresponding type of server is present in the cluster. Thus, a homogeneous clustered solution may be each of the three types of servers may be determined, and various heterogeneous solutions may also be determined. Thereafter, the capacity planning tool and/or the service provider may compare the cost, capacity, etc. of each solution to determine the optimal solution for the service provider to implement for supporting his expected workload.

TABLE 1

Combinations of Servers $S_1$, $S_2$, $S_3$ that may be implemented in a clustered media server solution.

| $S_1$ | $S_2$ | $S_3$ |
|---|---|---|
| 1 | 0 | 0 |
| 0 | 1 | 0 |
| 0 | 0 | 1 |
| 1 | 1 | 0 |
| 1 | 0 | 1 |
| 0 | 1 | 1 |
| 1 | 1 | 1 |

As described further below, in various embodiments provided herein the capacity planning tool is further operable to evaluate the capacity of media server configurations (including heterogeneous media server configurations) to determine whether such media server configurations not only satisfy Basic Capacity Parameters 104A, but also to determine whether the media server configurations satisfy specified Performability Parameters 104B. More particularly, the overall capacity planning process of one embodiment is described below which comprises two phases:

1) The basic capacity planning phase, which derives a media server configuration by taking into account two Basic Capacity Parameters 104A:
   Statistical Demand Guarantees 10, and
   Utilization Constraints 11; and
2) The performability capacity planning phase, which evaluates and refines the desirable configuration by taking into account two additional Performability Parameters 104B:

Regular-mode Overload Constraints 12, and

Node-Failure-mode Overload Constraints 13.

Cluster size validation is also performed. If the configuration recommended by the basic capacity planning and performability capacity planning phases is a single-machine configuration then the capacity planning procedure is completed. Otherwise, in the event that the recommended configuration is a heterogeneous cluster, the capacity planning tool performs an additional refinement of the cluster sizing by evaluating the impact of the load balancing solution (e.g., weighted round-robin) employed by the cluster, as well as the implications of the increased overall cluster memory. For improved efficiency, cluster size validation is performed during the performability capacity planning phase in certain embodiments.

Figure 8A:
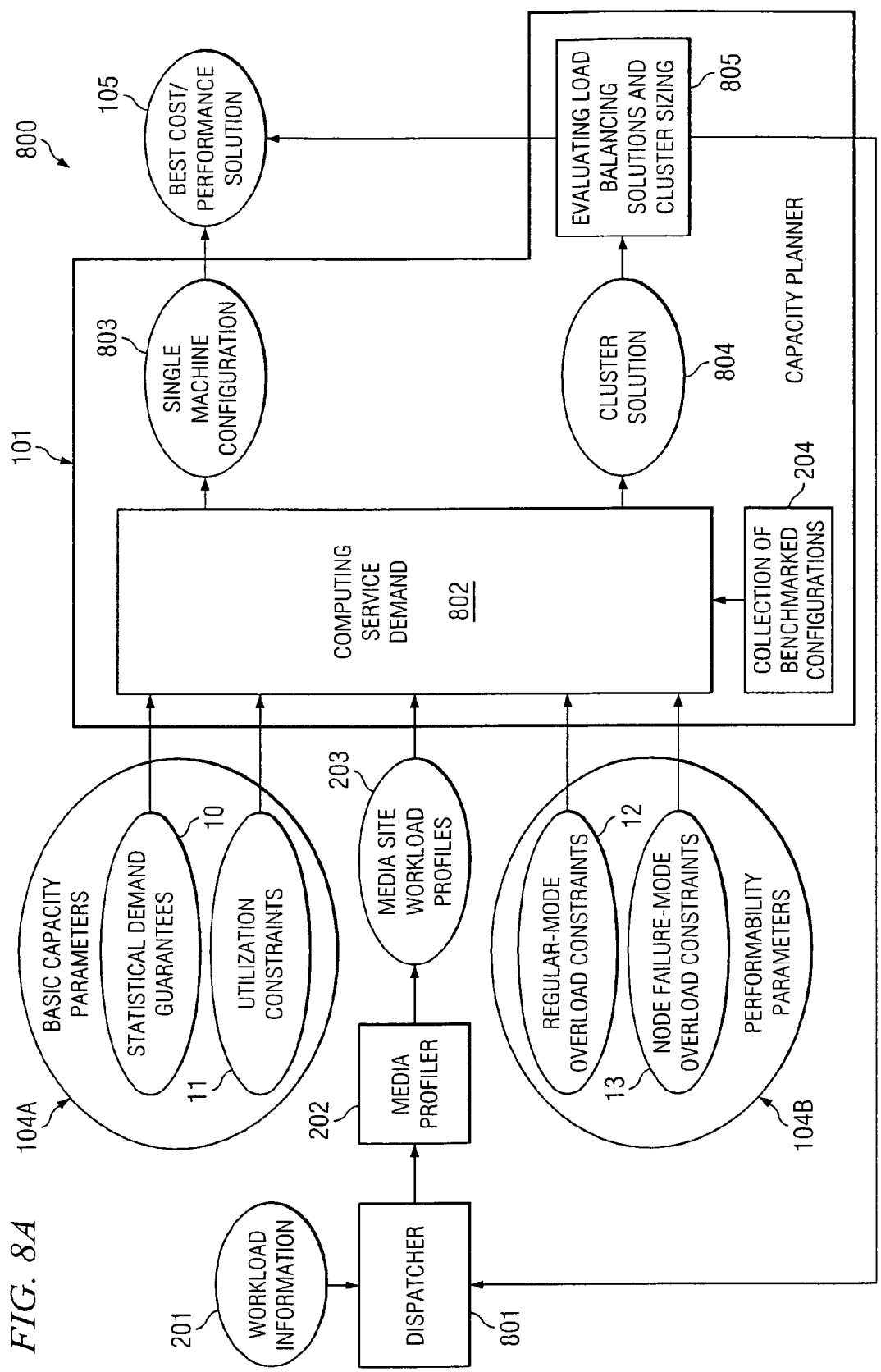
FIG. 8A shows an example of one embodiment of a capacity planning system for determining how many servers of each of a plurality of different configuration types are needed for supporting an expected workload.

Turning to FIG. 8A, one embodiment of a capacity planning system 800 is shown. This example embodiment is described hereafter with an example scenario in which a service provider has the following collection of servers:

$N_1$ servers of type $S_1$;

$N_2$ servers of type $S_2$; and $N_3$ servers of type $S_3$.

Thus, in this example, a finite number of each of the server configuration types is known which are available for use in forming a clustered media server solution. And, the problem is to design the performance satisfactory and price efficient solution out of these heterogeneous components (such that the proposed solution may have servers of different types $S_1$, $S_2$, and $S_3$ combined in the cluster for supporting the expected media workload). Of course, this embodiment of the capacity planning system is not limited in application to such a scenario, but may instead be used for evaluating any number of different types of server configurations that may be combined for forming a heterogeneous media server solution. Thus, while the above example collection of servers of types $S_1$, $S_2$, and $S_3$ are used in the below description, application of the capacity planning system is not limited to such an example collection, but may instead be used in evaluating any number of different types of servers.

There are several logical steps in performing the basic capacity planning phase according to this example embodiment. First, workload information 201 (e.g., the collected media server access logs for a service provider's site) is input to MediaProf 202 (via dispatcher 1001 in this example). MediaProf 202 generates Media site workload profiles 203 for each media server configuration under consideration, as described above. Thus, using the workload information 201 (e.g., collected media server access logs), MediaProf 202 computes a set of media site workload profiles 203 for different memory sizes of interest. In this example, MediaProf 202 computes a site workload profile 203 for a given memory size Ms of interest (e.g., a workload profile 203 for the memory size $Ms_1$ of server type $S_1$, a workload profile 203 for the memory size $Ms_2$ of server type $S_2$, and a workload profile 203 for the memory size $Ms_3$ of server type $S_3$). During the initial analysis, the Dispatcher component that imitates the load balancing strategy for the cluster of N nodes, has N=1.

The generated workload profiles 203 are input to capacity planner 101. Additionally, service parameters such as Basic Capacity Parameters 104A and Performability Parameters 104B are input to capacity planner 101. More specifically, in this example, Statistical Demand Guarantees 10, Utilization Constraints 11, Regular-Mode Overload Constraints 12, and Node-Failure Mode Overload Constraints 13 are input to capacity planner 101. Using a collection of benchmarked configurations 204, as well as the received workload profiles 203 and Basic Capacity Parameters 104A, capacity planner 101 computes, in block 802, a service Demand for each of the media server configurations under consideration in the manner described above. That is, the capacity planner 101 takes the media site workload profile of each type of server configuration included in the cluster under evaluation and computes the corresponding service Demand according to the above-described Demand formula using the cost functions for each corresponding type of server configuration.

For instance, for evaluating a first server configuration (e.g., the one of the server configuration types $S_1$, $S_2$, and $S_3$ that is the most powerful or has the largest memory), capacity planner uses the corresponding benchmarks 204 (e.g., SFB and UFB) for such configuration along with the corresponding workload profile 203 (e.g., $MP_1$) for such configuration in computing the service Demand for that configuration in block 802. From the computed service Demand for this first server configuration, capacity planner 101 determines whether a single one of such first server configuration can support the workload in a desired manner (e.g., in a manner that complies with Basic Capacity Parameters 104A and Performability Parameters 104B). If determined that a single one of such first server configuration can support the workload in a desired manner, capacity planner identifies that such a media server configuration is suitable for supporting the workload in block 803.

However, if capacity planner 101 determines from the computed service Demand that a single one of the first server configuration under consideration is not capable of supporting the workload in the desired manner, capacity planner identifies in block 804 that a cluster is needed. An initial determination of the number of nodes (i.e., the number of such first server configurations) to be included in the clustered media server solution is made from the computed service Demand. For example, if the computed service Demand for this first server configuration is 5 (or any number between 4 and 5, such as 4.5), then capacity planner 101 can initially determine that a cluster having 5 nodes of this first configuration is suitable for supporting the workload in the desired manner.

Of course, the initial computation of the service Demand was made using the workload profile 203 generated for a single one of the first server configuration. Thus, while the initial computation of the service Demand is reliable for indicating whether a single one of the first server configuration is capable of supporting the workload or whether a cluster of additional servers is needed, if the service Demand indicates that a cluster is needed, the specific number of nodes initially indicated by such service Demand (e.g., 5) may be less reliable because such number is estimated through an evaluation of the resources of a single one of the first server configuration (rather than an actual evaluation of the resources of a cluster having the estimated number of nodes and the type of load balancing strategy employed for such cluster). Accordingly, to verify that the initial indication of 5 nodes, in the above example, is accurate, capacity planner 101 may re-compute the service Demand taking into consideration the resources and load balancing strategy of a cluster of the initially indicated nodes (up to the maximum number of such nodes available to the service provider).

If the determined number of nodes of the first configuration to be included in a homogeneous solution is greater than the finite number of nodes of such first configuration that are available to the service provider, then a heterogeneous solution that includes ones of the available nodes of other types is evaluated. For instance, suppose the computed service Demand determines that 5 nodes of the server configuration $S_1$ are needed for supporting the expected workload in the desired manner, and further suppose that only 2 nodes of server configuration $S_1$ are available to the service provider (i.e., $N_1=2$ in the above example); in this case, the remaining demand beyond what can be supported by the 2 available nodes of server configuration $S_1$ is to be supported by a server configuration of a different type (e.g., by one or more nodes of configurations $S_2$ and $S_3$).

Accordingly, if the Demand determined for the homogeneous case of the first server configuration $S_1$ exceeds the number of such servers of configuration $S_1$ that are available (i.e., the determined number of $S_1$ servers needed in a homogeneous solution exceeds the number $N_1$ of such $S_1$ servers that are available), then a second configuration types is considered in combination with the first configuration type. For instance, additional servers of the second configuration $S_2$ (e.g., the second most powerful or second largest memory configuration) may be added to the $N_1$ servers of the first type $S_1$ to form a heterogeneous cluster. Combinations of nodes of the $S_1$ and $S_2$ servers may be evaluated to determine whether the available servers of types $S_1$ and $S_2$ are capable of supporting the expected workload as desired. If determined that the $N_1$ servers of type $S_1$ and the $N_2$ servers of type $S_2$ are insufficient for supporting the expected workload as desired, then the third type of server my be included in the heterogeneous cluster. For instance, additional servers of the third configuration $S_3$ (e.g., the third most powerful or third largest memory configuration) may be added to the $N_1$ servers of the first type $S_1$ and the $N_2$ servers of the second type $S_1$ to form a heterogeneous cluster. Combinations of nodes of the $S_1$, $S_2$, and $S_3$ servers may be evaluated to determine whether the available servers of these types are capable of supporting the expected workload as desired. That is, additional servers of type $S_3$, up to the available $N_3$ number of such servers, may be progressively added to the combination of $N_1$ servers of type $S_1$ and the $N_2$ servers of type $S_2$ to determine whether a heterogeneous solution can be obtained having sufficient capacity for supporting the expected workload as desired.

Thus, the resulting (intermediate) profile is the list of pairs (ti, di) reflecting that in time ti the service demand is di. It should be noted that when evaluating a heterogeneous cluster that includes nodes of each of the three different types of servers: $S_1$, $S_2$, and $S_3$, three different service demand profiles are built by block 802 where the first service demand profile is built for a server type $S_1$, the second service demand profile is built for a server type $S_2$, and the third service demand profile is built for a server type $S_3$. More particularly, dispatcher 801 specifies the portion of workload 201 to be dispatched to each of the three different types of servers in accordance with a specified load-balancing strategy (e.g., weighted round-robin, etc.), and MediProf 202 generates a workload profile 203 for each of the three different types of servers. Capacity planner 101 receives the workload profiles 203 and, in block 802, uses the benchmarks 204 for each server configuration $S_1$, $S_2$, and $S_3$ to compute a service Demand for each respective server configuration. Then, the capacity planner 101 computes a cumulative density function (CDF) of aggregate service demand that is normalized over time.

As illustrated in the example of FIG. 8A, capacity planner 101 evaluates the load balancing strategy(ies) for the initially determined number of nodes (as indicated by the service Demand) in block 805. The resources of such cluster of nodes and the load balancing strategy(ies) are taken into account in generating a new workload profile 203. For instance, dispatcher 801 inputs identification of the resources of such a clustered media server, as well as identification of the load balancing strategy to be utilized by the cluster, into MediaProf 202, which generates the new workload profile 203 for such cluster. Thus, for example, if dispatcher 801 initially dispatches requests of workload 201 to a cluster having one of each of the three types of servers $S_1$, $S_2$, and $S_3$ in accordance with a specified load-balancing strategy, which results in a workload profile 203 generated by MediaProf 202 for each of the three types of servers. Based on analysis in block 802 by capacity planner 101 of the workload profile 203, a service Demand is determined for each of the types of servers, which may specify, for example, that 2 nodes of server type $S_1$ are needed to support the portion of the workload dispatched to such server type $S_1$, 2 nodes of server type $S_2$ are needed to support the portion of the workload dispatched to such server type $S_2$, and 1 node of server type $S_3$ are needed to support the portion of the workload dispatched to such server type $S_3$.

Once an initial determination is made regarding how many servers of each type to include in the clustered media server solution, the resources of such cluster of nodes and the load balancing strategy(ies) are taken into account in generating a new workload profile(s) 203. For instance, dispatcher 801 inputs identification of the resources of such a clustered media server (e.g., 2 nodes of server type $S_1$, 2 nodes of server type $S_2$, and 1 node of server type $S_3$ in this example), as well as identification of the load balancing strategy to be utilized by the cluster, into MediaProf 202, which generates the new workload profile 203 for each of the server types of such cluster. As described further below, a new weighted load balancing strategy (e.g., weighted round-robin) that allocates weights in a manner that accounts for all of the nodes in this new cluster may also be determined.

Figure 8B:
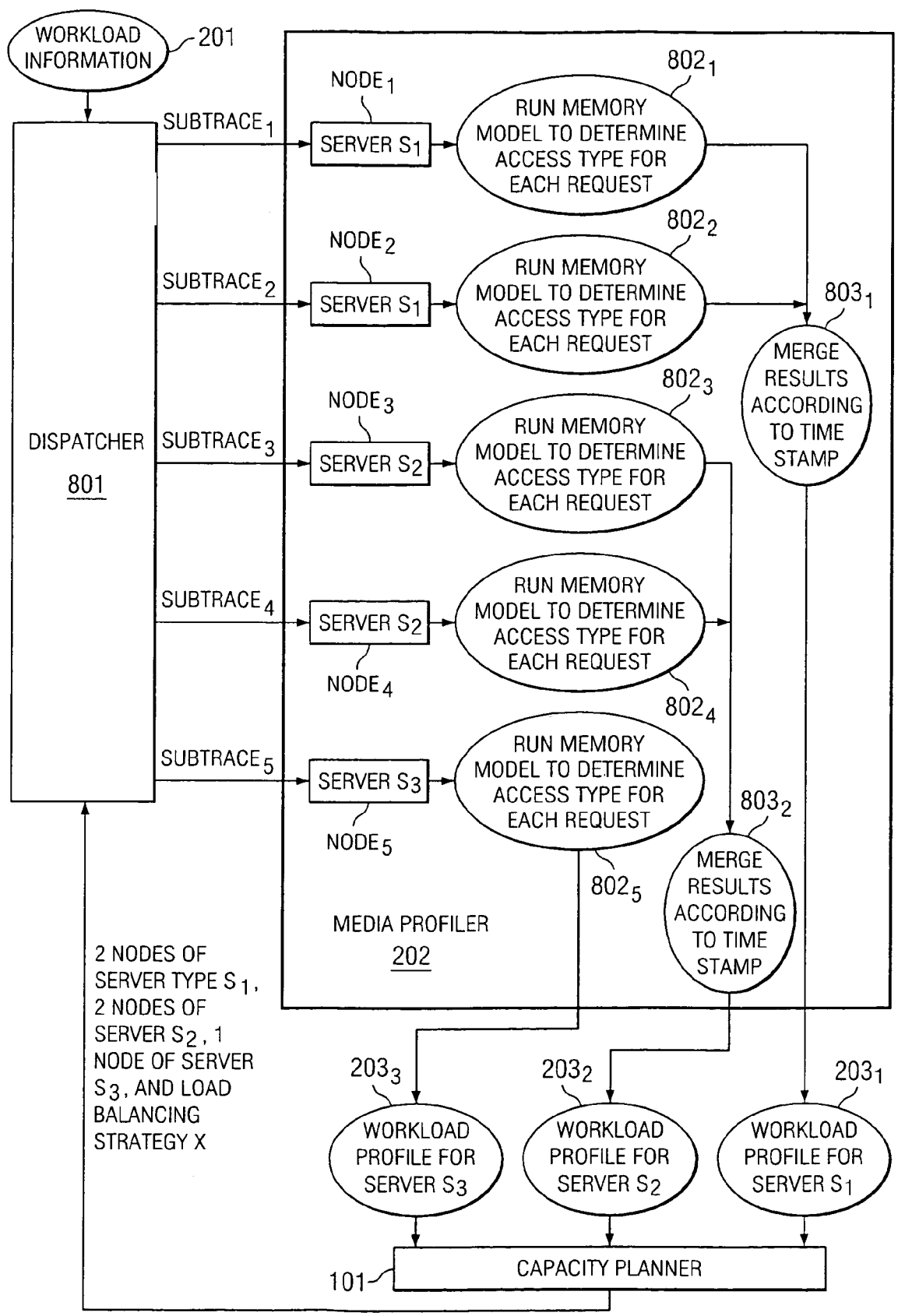
FIG. 8B shows an example of re-generating a workload profile for each of a plurality of different server configuration types in accordance with the example embodiment of FIG. 8A.

Turning to FIG. 8B, an example of re-generating workload profiles 203 for a cluster of servers of various configuration types $S_1$, $S_2$, and $S_3$ in accordance with one embodiment is shown. In this example, capacity planner 101 determines (e.g., from the service Demand computed for the portion of the workload 201 that is dispatched to server $S_1$ that a cluster of 2 nodes of such server configuration $S_1$ are required for supporting this portion of the expected workload as desired (e.g., in compliance with Basic Capacity Parameters 104A and Performability Parameters 104B). Further, capacity planner 101 determines (e.g., from the service Demand computed for the respective portions of the workload 201 dispatched to servers $S_2$ and $S_3$ that a cluster of 2 nodes of such server configuration $S_2$ and 1 node of server configuration $S_3$ are required for supporting their respective portions of the expected workload as desired (e.g., in compliance with Basic Capacity Parameters 104A and Performability Parameters 104B). Capacity planner 101 notifies dispatcher 801 of a cluster of 2 nodes of server type $S_1$, 2 nodes of server type $S_2$, and 1 node of server type $S_3$. In this example, capacity planner 101 also notifies dispatcher 801 of a load balancing strategy "X" that is to be used by the cluster. In this example, this load balancing strategy is assumed to be a weighted round-robin strategy. Of course, while this example is described as using a weighted round-robin strategy, this embodiment may be readily adapted to be used for various other load balancing strategies.

While capacity planner 101 notifies dispatcher 801 of the load balancing strategy used in this example, such load balancing strategy may be provided to dispatcher 801 in some other way in alternative embodiments, such as through user input, dispatcher 801 reading the desired load balancing strategy to be used from a data storage device, etc. In this example, dispatcher 801 uses a weighted round-robin load balancing strategy; and capacity planner 101 computes the respective service Demand for each of the workload profiles 203.

Dispatcher 801 uses the weighted round-robin load balancing strategy to generate subtraces (which may be referred to herein as "sub-workloads") for workload 201. That is, dispatcher 801 divides workload 201 into 5 subtraces, Subtrace$_1$, Subtrace$_2$, . . . , Subtrace$_5$, wherein each subtrace identifies the portion of workload 201 (i.e., the corresponding requests) that is to be serviced by a corresponding one of the 5 nodes of the media server configuration according to the weighted round-robin load balancing strategy employed by the cluster under consideration. For instance, in the example of FIG. 8B, Subtrace$_1$ is generated for Node$_1$ of server configuration S$_1$, Subtrace$_2$ is generated for Node$_2$ of server configuration S$_1$, Subtrace$_3$ is generated for Node$_3$ of server configuration S$_2$, Subtrace$_4$ is generated for Node$_4$ of server configuration S$_2$, and Subtrace$_5$ is generated for Node$_5$ of server configuration S$_3$. Each of the resulting subtraces are input to MediaProf 202, which processes each subtrace for its corresponding node to determine the access types of each request (memory versus disk). For instance, in the example embodiment of FIG. 8B, in operational block 802, MediaProf 202 runs the memory model (for server configuration S$_1$) to determine the access type for each request in Subtrace$_1$ being serviced by Node$_1$. Similarly, in operational block 802$_2$ MediaProf 202 runs the memory model (for server Configuration S$_1$) to determine the access type for each request in Subtrace$_2$ being serviced by Node$_2$. Likewise, in operational blocks 802$_{3-4}$ MediaProf 202 runs the memory model (for server Configuration S$_2$) to determine the access type for each request in the respective Subtraces$_{3-4}$ being serviced by their corresponding Nodes$_{3-4}$ and in operation block 802$_5$ MediaProf 202 runs the memory model (for server Configuration S$_3$) to determine the access type for each request in Subtrace$_5$ being serviced by Node$_5$.

Thus, a sub-workload (or subtrace) profile is generated for each of Subtraces$_{1-5}$. Then, the sub-workload profiles for each server type included in the cluster are merged using the time stamps of the individual sub-workloads. That is, the sub-workload profiles for like server types are merged together, which results in a sub-workload profile for each of the server types S$_1$, S$_2$, and S$_3$ included in the cluster under evaluation. In the specific example of FIG. 8B, in operational block 803$_1$, MediaProf 202 merges the results determined in operations 802$_{1-2}$ according to timestamp to generate a workload profile 203$_1$ for the servers of configuration type S$_1$ of the cluster. Similarly, in operational block 803$_2$, MediaProf 202 merges the results determined in operations 80234 according to timestamp to generate a workload profile 203$_2$ for the servers of configuration type S$_2$ of the cluster. In this example, only one server of configuration S$_3$ is included in the cluster under evaluation, and thus no merging operation is performed for that server. Accordingly, the sub-workload profile determined in block 802$_5$ is output as workload profile 203$_3$ for the server of configuration type S$_3$ of the cluster.

Accordingly, the newly generated workload profiles 203$_{1-3}$ for the heterogeneous cluster under consideration identifies the number of concurrent requests serviced by each type of server included in the cluster at any given time, as well as an indication of the respective type of access for each request (memory versus disk). Therefore, the benchmarks and cost function for each server configuration type included in the cluster (types S$_1$, S$_2$, and S$_3$ in this example) can be used by capacity planner 101 to re-compute the service Demand for each server configuration type in this cluster based on their respective workload profile 203$_{1-3}$.

For instance, as shown in FIG. 8A, capacity planner 101 then uses the workload profiles 203 generated for the cluster under consideration to compute, in block 802, a service Demand for each type of servers included in such cluster. This is used to verify that the initially determined number of nodes of each server type to be included in the cluster is accurate. For instance, continuing with the above example, capacity planner 101 uses the workload profile 203, for the servers of type S$_1$ and the information 204 for such configuration S$_1$ to re-compute the service Demand for such S$_1$ servers included in the cluster under evaluation to verify that the computed service Demand indicates that 2 nodes of such server configuration S$_1$ are needed in the cluster for supporting the workload in the desired manner. If the service Demand re-computed for each of the server types confirms the same number as initially determined (e.g., that 2 nodes of each of servers S$_1$ are needed and 1 node of server S$_3$ is needed), capacity planner 101 outputs such heterogeneous cluster as one possible solution. On the other hand, if the service Demand computed for one or more of the types of servers indicates a different number of nodes, such as 1 node of server S$_1$, then capacity planner 101 repeats the above process for a cluster having the adjusted number of nodes (e.g., 1 node of server S$_1$, along with the indicated correct number of nodes for types S$_2$ and S$_3$) in order to verify this estimate of 4 heterogeneous nodes.

Then, in this example embodiment, the capacity planner 101 further takes into consideration the Performability Parameters 104B that are specified by a service provider. Since workload measurements of existing media services indicate that client demands are highly variable (the "peak-to-mean" ratio may be an order of magnitude), it may not be cost-effective to overprovision the system for the peak load demand. In this case, the service provider may specify:

1) Statistical Demand Guarantees: for example, "Based on the past workload history, find an appropriate performance solution that 95% of the time is capable of processing the applied load". Using the CDF of computed service demand profile, the capacity planner 101 finds the 95-th percentile of the site's service demands over time. Let us denote this demand as $D_{95}\%$.

2) Utilization Constraints: for example, "Based on the past workload history, find an appropriate performance solution that 90% of the time is utilized under 70% of its capacity." This way, a service provider may specify a configuration with some reasonable "spare" capacity for future growth and changing access patterns. Capacity planner 101 finds the 90-th percentile of the site's service demands, i.e. $D_{90}\%$. Then the requirement for a configuration that is utilized under 70% of its capacity is ($D_{90\%}/0.7$). Let us denote this demand as $D_{Util}$.

Thus, the basic capacity requirement for a desirable configuration in this example is: $D_{basic}=\max(D_{95}\%, D_{Util})$ rounded up to the closest integer. It should be noted that since the service provider aims to build a solution that may incorporate the three different types of servers S$_1$, S$_2$, and S$_3$, the three different configurations is derived at this step. The operation of the capacity planning tool in taking into consideration the Performability Parameters 104B are further described herein below.

Turning to FIG. 9, an example operational flow diagram for the operation of capacity planner 101 in accordance with one embodiment is shown. In operational block 901, capacity planner 101 performs Basic Capacity Planning to determine a media server configuration that supports the expected workload in a manner that complies with Basic Capacity Parameters 104A. That is, capacity planner 101 takes into account Statistical Demand Guarantees 10 and Utilization Constraints 11 in determining an initial media server configuration. As described above, in accordance with the embodiments of the capacity planner provided herein such media server configuration may be a heterogeneous cluster.

In operational block 902, capacity planner 101 performs Performability Capacity Planning to evaluate and, if proper, refine the media server configuration determined during the Basic Capacity Planning process (of block 901) to ensure that the media server configuration supports the expected workload in a manner that complies with Performability Parameters 104B. That is, capacity planner 101 uses Regular-Mode Overload Constraints 12 and Failure-Mode Overload Constraints 13 to further evaluate the media server configuration determined during the Basic Capacity Planning process and thus determine whether to refine/modify such media server configuration in order to comply with these Performability Parameters 104B. For instance, as an example of a Regular-mode Overload Constraint 12, suppose the service provider specifies: "Based on the past workload history, find an appropriate performance solution such that the amount of average overload is limited by 2% in any 60 minute interval." Let us denote the outcome of the Performability Capacity Planning for acceptable overload during the regular processing (e.g., with all nodes of the cluster operational) as $D_{Overload}^{Reg}$. As an example of a Failure-Mode Overload Constraint 13, suppose the service provider specifies: "Based on the past workload history, find an appropriate cluster solution such that in case of 1-node failure the amount of average overload per node in the remaining system is limited by 20% in any 60 minute interval." Let us denote the outcome of the Performability Capacity Planning for acceptable overload during 1-node failure as $D_{Overload}^{N-1}$.

In certain embodiments, if the determined media server configuration that results from operations 901-902 is a cluster of servers (either a homogeneous or heterogeneous of clusters), capacity planner 101 performs cluster size validation in operational block 903. That is, as discussed above with FIGS. 8A-8B, if a cluster solution is determined (in block 804), capacity planner 101 may evaluate the impact of a load balancing solution to be utilized by such cluster solution (e.g., which may be assumed in certain implementations to be a weighted round-robin strategy), as well as the implications of the increased overall cluster memory, to verify that the number of servers to be included in the cluster is accurate, and refine the number of servers included such cluster solution if the number is inaccurate.

Considering further the Basic Capacity Planning performed in block 901, suppose the service provider would like to determine the number of servers (nodes) of each server $S_1$, $S_2$, and $S_3$ having memory sizes $M_{S1}$, $M_{S2}$ and $M_{S3}$, respectively, for supporting its expected workload 201. In accordance with one embodiment, there are several logical operations performed in this Basic Capacity Planning procedure. First, the media site workload profile 203 is computed for each of the server configurations included in the heterogeneous cluster under evaluation. That is, as described above with FIG. 8B, using the respective portions of media site access log 201 dispatched to each node of the heterogeneous cluster (according to a weighted load balancing strategy), MediaProf 202 computes a workload profile 203 for each of the server configurations included in the heterogeneous cluster under evaluation (such as the example workload profiles described above in connection with FIGS. 3 and 4).

Capacity planner 101 then uses this workload profile 203 for computing a corresponding service demand profiles for each of the server configuration types included in the heterogeneous cluster under evaluation (i.e., server configurations $S_1$, $S_2$, and $S_3$ in this example). As described above, capacity planner 101 has a collection of benchmarked configurations. For each of the server configuration types included in the heterogeneous cluster under evaluation, capacity planner 101 takes workload profile 203 determined for such server configuration type and computes the corresponding service demands according to capacity equation (1), discussed above, with the cost functions corresponding to such server configuration type. Thus, the resulting (intermediate) profile is a list of pairs $(t_i,d_i)$ reflecting that in time $t_i$ the service demand is $d_i$. Then, capacity planner 101 computes a cumulative density function (CDF) of aggregate service demand that is normalized over time. We assume in this example that media files are encoded at a constant bit rate (CBR), and it is therefore a straightforward task to compute the CDF of network bandwidth requirements and incorporate them in the capacity planning process.

It should be noted that when evaluating a heterogeneous cluster that includes nodes of each of the three different types of servers: $S_1$, $S_2$, and $S_3$, three different service demand profiles are built where the first service demand profile is built for a server type $S_1$, the second service demand profile is built for a server type $S_2$, and the third service demand profile is built for a server type $S_3$. More particularly, dispatcher 801 specifies the portion of workload 201 to be dispatched to each of the three different types of servers in accordance with a specified load-balancing strategy (e.g., weighted round-robin, etc.), and MediaProf 202 generates a workload profile 203 for each of the three different types of servers. Capacity planner 101 receives the workload profiles 203 and, in block 802, uses the benchmarks 204 for each server configuration $S_1$, $S_2$, and $S_3$ to compute a service Demand for each respective server configuration.

The Basic Capacity Parameters 104A are then considered. Since workload measurements of existing media services indicate that client demands are highly variable (the "peak-to-mean" ratio may be an order of magnitude), it may not be cost-effective to overprovision the system for the peak load demand. In this case, the service provider may specify Statistical Demand Guarantees 10, which may specify, for example, that a desired media server configuration is one that provides a performance solution that 95% of the time is capable of processing the expected workload 201. Using the CDF of computed service demand profile, the capacity planner 101 is capable of determining the 95-th percentile of the site's service demands over time. Let us denote this demand as $D_{stat\_Demand\_Guarantee}$ (which in this example is denoted $D_{95}\%$).

The service provider may further specify Utilization Constraints 11, which may specify, for example, that a desired media server configuration is one that 90% of the time is utilized under 70% of its capacity under the expected workload 201. In this way a service provider may specify a configuration with some reasonable "spare" capacity for future growth and changing access patterns. Capacity planner 101 is operable to determine the 90-th percentile of the site's service demands, i.e., $D_{90}\%$. Then, the requirement for a configuration that is utilized under 70% of its capacity is $(D_{90}\%/0.7)$. Let us denote this demand as $D_{Util}$.

Thus, the basic capacity planning in the above example determines the basic service demand as: $D_{basic}=\max(D_{95\%}, D_{Util})$ rounded up to the closest integer. Again, in the case in which a heterogeneous cluster of server types $S_1$, $S_2$, and 53 is under evaluation, a $D_{basic}$ service demand is computed for each of the server types included in such cluster. Thus, for instance, if $D_{basic\_S1}$ is determined to be 4.5, $D_{basic\_S2}$ is determined to be 2.8, and $D_{basic\_S3}$ is determined to be 6.9, an initial determination is made in the basic capacity planning process that 5 nodes of server type $S_1$, 3 nodes of server type $S_2$, and 7 nodes of server type $S_3$ is a proper "basic" heterogeneous media server solution.

As described hereafter in certain embodiments, a proper weighted load balancing strategy, such as a weighted round-robin strategy, is determined by the capacity planning tool for a heterogeneous cluster under evaluation. Media server clusters are used to create scalable and highly available solutions. We assume in this example that each media server in a cluster has access to all the media content. Therefore, any server can satisfy any client request.

A load balancing solution for a homogeneous media server cluster (i.e. a cluster having nodes of all the same configuration type), such as Round-Robin (RR), tries to distribute the requests uniformly to all the machines. However, when the cluster is comprised of heterogeneous machines (some of the servers have a higher capacity than the other ones in the cluster) it may be preferable to use a Weighted Round Robin (WRR) load balancing solution. Of course, any load balancing strategy desired to be employed may be evaluated by capacity planner 101 using the techniques described herein. In certain embodiments, capacity planner 101 is capable of determining an optimal WRR load balancing solution to implement for a given heterogeneous media server solution. Thus, the capacity planner 101, in certain embodiments, outputs not only one or more heterogeneous media server configurations, but also outputs for each heterogeneous media server configuration the optimal WRR load balancing solution to employ for such configuration in order to support the expected workload in the desired manner (e.g., in accordance with the Basic Capacity Parameters 104A and Performability Parameters 104B).

A WRR load balancing solution allows a performance weight to be assigned to each server in a cluster. Weighted load balancing is similar to the round-robin technique, however, servers with a higher weight value receive a larger percentage of requests at any one time. WRR administrators can assign a weight to each server of a clustered media server configuration, and the WRR uses this weight to determine the percentage of the current number of connections to give each server.

Weighting-value is the value to use in the cluster load balancing algorithm. The range can be from 1 to 100, in this example implementation, but can of course be any range of weighting values desired to be used in other WRR implementations. For example, in a configuration with five media servers, the percentage of requests may be defined as follows:

| | |
|---|---|
| Weight of server 1: | 7 |
| Weight of server 2: | 8 |
| Weight of server 3: | 2 |
| Weight of server 4: | 2 |
| Weight of server 5: | 5 |
| Total weight of all servers | 24. |

This distribution results in server 1 getting 7/24 of the current number of requests, server 2 getting 8/24, server 3 getting 2/24, and so on. If a new server, server 6, is added with a weight of 10, it will receive 10/34 of the requests distributed thereto, and so on.

In one example embodiment of the capacity planning tool, a heterogeneous cluster sizing with a corresponding WRR load balancing solution is determined and output. Let the outcome of the first iteration of Capacity Planner 101 for the original media site expected workload 201 and the media server $S_i$ ($i=1, 2, 3$) be the capacity requirement of $N_i^{all}$ servers. Let also $N_i < N_i^{all}$. Otherwise, the service provider can use a homogeneous cluster solution. We assume, in this discussion, that due to the lack of nodes of any particular type, the service provider has to design a heterogeneous media cluster solution out of the existing variety of different server configurations.

Let $N_1^{all} \leqq N_2^{all} \leqq N_3^{all}$. Thus, server $S_3$ had the smallest capacity and requires a highest number of nodes to support the given media workload 201 (the full workload), while media server $S_1$ had the largest capacity and requires the smallest number of nodes for the same traffic. Now, we can express the capacity of server $S_1$ via the capacity of servers $S_2$ and $S_3$. Similarly, we can express the capacity of server $S_2$ via the capacity of server $S_3$:

$$S_1 = \frac{N_3^{all}}{N_1^{all}} \times S_3$$

$$S_2 = \frac{N_3^{all}}{N_2^{all}} \times S_3$$

Additionally, the above equations help to compute the weights for the corresponding servers in the cluster when using a WRR load balancing solution: for a single request sent to a server of type $S_3$, there should be $$\frac{N_3^{all}}{N_1^{all}}$$

requests sent to a server of type $S_1$ and $$\frac{N_3^{all}}{N_2^{all}}$$

requests sent to a server of type $S_2$. This is similar to setting up the weights in WRR as follows:

Weight of server $S_1 : \dfrac{N_3^{all}}{N_1^{all}}$

Weight of server $S_2 : \dfrac{N_3^{all}}{N_2^{all}}$

Weight of server $S_3 : 1$

Since weights are reflected as integers in this example implementation, the closest integer numbers reflecting similar weights are determined: in particular, each weight can be multiplied by $N_1^{all} \times N_2^{all}$ to get the integer expression:

Weight of server $S_1 \quad N_3^{all} \times N_2^{all}$

Weight of server $S_2 \quad N_3^{all} \times N_1^{all}$

Weight of server $S_3 \quad N_1^{all} \times N_2^{all}$

After that, the capacity planning tool finds all the feasible combinations of different servers of $S_1$, $S_2$ and $S_3$ that can support the given traffic (as a result of the first iteration). In accordance with one embodiment, these combinations can be determined in the following way. A given workload requires $N_1^{all}$ servers of type $S_1$ However, the service provider only has $N_1$ servers of type $S_1$. Thus after including $N_1$ servers of type $S_1$ in the solution, the additional capacity $(N_1^{all}-N_1) \times S_1$, has to be composed out of servers $S_2$ and/or $S_3$. Note that $$S_1 = \frac{N_2^{all}}{N_1^{all}} \times S_2.$$

Thus we can compute how many additional servers $S_2$ is required to be added in order to support a given traffic (with just servers $S_1$ and $S_2$):

$$k_2 = (N_1^{all} - N_1) \times \frac{N_2^{all}}{N_1^{all}},$$

where $k_2$ is rounded up to the closest integer.

If $k_2 \leq N_2$ then the combination of $N_1$ servers of type $S_1$ and $k_2$ servers of type $S_2$ will be a possible combination for a given traffic. If $k_2 > N_2$, then after including $N_1$ servers of type $S_1$ and $N_2$ servers of type $S_2$ in the solution, the additional remaining capacity has to be composed out of servers $S_3$. The procedure is similar to that described above.

Suppose the remaining traffic requires $k_3$ servers of type $S_3$. If $k_3 \leq N_3$ then we have a feasible solution which has $N_1$ servers of type $S_1$, $N_2$ servers of type $S_2$, and $k_3$ servers of type $S_3$. Otherwise, if the existing collection of servers ($N_1$ of $S_1$, $N_2$ of $S_2$, $N_3$ of $S_3$) is not sufficient to support a given traffic, then the service provider may need to add the sufficient number of the "cheapest" server type to get the desirable cluster configuration.

In a similar way, another appropriate solution comprised of $n_1$ servers of type $S_1$ $n_2$ servers of type $S_2$, and $n_3$ servers of type $S_3$ can be designed, where $n_1 \leq N_1$, $n_2 \leq N_2$, and $n_3 \leq N_3$. The capacity planning tool can perform an exhaustive search of all possible combinations. In the designed heterogeneous cluster, the WRR load balancing solution uses the server weights that are computed as described above.

Thus, let us consider the solution identified during the first iteration having $N_1$ servers of type $S_1$, $n_2$ servers of type $S_2$ and $n_3$ servers of type $S_3$, where $n_1 \leq N_1$, $n_2 \leq N_2$, and $n_3 \leq N_3$. In one example embodiment, then the capacity planner tool performs the following sequence of steps to re-evaluate the identified cluster solution:

A) partition the original media site workload W (workload 201 of FIG. 10A) into $k=n_1+n_2+n_3$ sub-workloads $W_1$, $W_2, \ldots, W_k$ using dispatcher 1001 employing the corresponding WRR load balancing strategy;

B) compute the sub-workload profile for each of sub-workloads $W_1, W_2, \ldots, W_k$ using MediaProf 202;

C) merge the computed sub-workload profiles for the same server type by using the time stamps of individual sub-workloads: i.e., at this point we have the three workload profiles 203—one for each of server types $S_1, S_2, S_3$;

D) compute the service demand profiles for those three workload profiles 203 by using the corresponding cost functions for each media server type, i.e., Demand $D_1$ for a workload that is processed by servers of type $S_1$, Demand $D_2$ for a workload that is processed by servers of type $S_2$, and Demand $D_3$ for a workload that is processed by servers of type $S_3$;

E) combine the service demand requirements, the SLAs 104$_A$ and the configuration constraints 104$_B$ for each of the service demand profiles: $D_1, D_2$ and $D_3$;

F) if the outcome of step (E) is still the capacity requirements of $n_1$ servers of type $S_1$, $n_2$ servers of type $S_2$, and $n_3$ servers of type $S_3$, then the cluster sizing is done correctly and the capacity planning process for a considered cluster configuration is completed;

G) if for one of the service demand profile $D_i$ (of server type $S_i$) the computed capacity requirements are $l_i$ nodes ($l_i \neq n_i$), then the capacity planning process is repeated for the a new heterogeneous cluster configuration: where the $S_i$ server type is the "smallest" capacity server that satisfies this requirement;

H) if 1) ($l_i < n_i$) or 2) ($l_i > n_i$ and $l_i \leq N_i$) then the whole process is repeated for a new heterogeneous cluster configuration: where the $S_i$ server type has $l_i$ nodes;

I) if $l_i > n_i$ and $l_i > N_i$, then the whole process is repeated for a new heterogeneous cluster configuration: where the $S_i$ server type has $N_i$ nodes (because $S_i$ has $l_i = N_i$ nodes available); and J) if $l_i > n_i = N_i$ (i.e. all the nodes of a server type $S_i$ are exhausted) then let the server type $S_j$ be the closest by capacity to the server type $S_i$ that has available nodes to be added to the cluster solution, and let the server type $S_j$ be with the cheapest cost (we would like to minimize the cost of the overall configuration). Then, the whole process is repeated for a new heterogeneous cluster configuration, where the $S_j$ server type has $n_j+1$ nodes.

The basic capacity planning process of operational block 901 determines a suitable heterogeneous media server configuration by sizing the system according to the main performance requirements for the compliant time, e.g., identifies the system that is capable of processing the applied load with no performance degradation for 95%. However, it does not provide any guarantees or limits on how "bad" the system performance could be in the remaining 5% of non-compliant time. The Performability Capacity Planning of block 902 evaluates the workload performance on the heterogeneous media server configuration recommended by the Basic Capacity Planning process of block 901 (and, possibly, refine the configuration) in order to limit the amount of possible overload per node during the regular processing time and/or to avoid the excessive performance degradation during node failure periods.

Let us first consider a simple example. FIGS. 10A-10B show the service demands of two example workloads over time (more exactly, a day-long sample of the workloads). That is, FIG. 10A shows service demands for a first example workload, and FIG. 10B shows service demands for a second example workload. Most of the time, the service demand of both workloads corresponds to 1.7 nodes. The peak load demand reaches 3.3 nodes for both workloads.

However, the access patterns of these two workloads are very different. The example workload shown in FIG. 10A has a number of peak-load spikes each lasting for 10 minutes (min) with more than 1-hour time gaps between each spike. Due to its nature, this first example workload is referred to herein as a "Thin Spikes" workload. The example workload shown in FIG. 10B has a different access pattern: there is a single peak-load spike lasting for a duration of 100 min. This second example workload is referred to herein as a "Fat Spikes" workload.

Figure 11A:
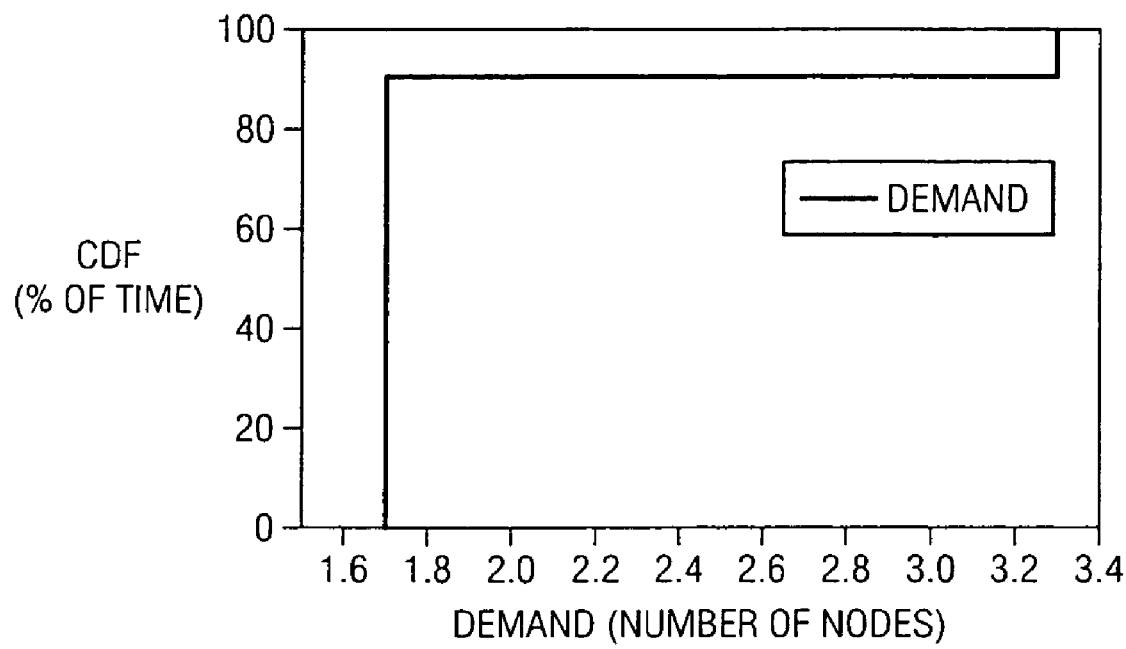
FIG. 11A shows a graph illustrating CDF service demand for each of the example workloads of FIGS. 10A and 10B.

As shown in the graph of FIG. 11A, these two workloads have the same CDF of service demand: 90% of the time, the service demand is 1.7 nodes, while for 10% of the time it reaches a peak load demand of 3.3 nodes.

In continuing with this example, suppose that a service provider specifies the desirable media server configuration as one that: a) 90% of the time satisfies the workload demand; and b) 90% of the time is utilized under 70%. Accordingly, in this example, the Basic Capacity Planning (of operational block 901) will recommend a 3-node cluster (of nodes of this particular configuration type) for inclusion in an appropriate solution:

$$D_{basic}=\max(D_{90\%}, D_{Util})=\max(1.7, 2.4)=2.4$$

Figure 11B:
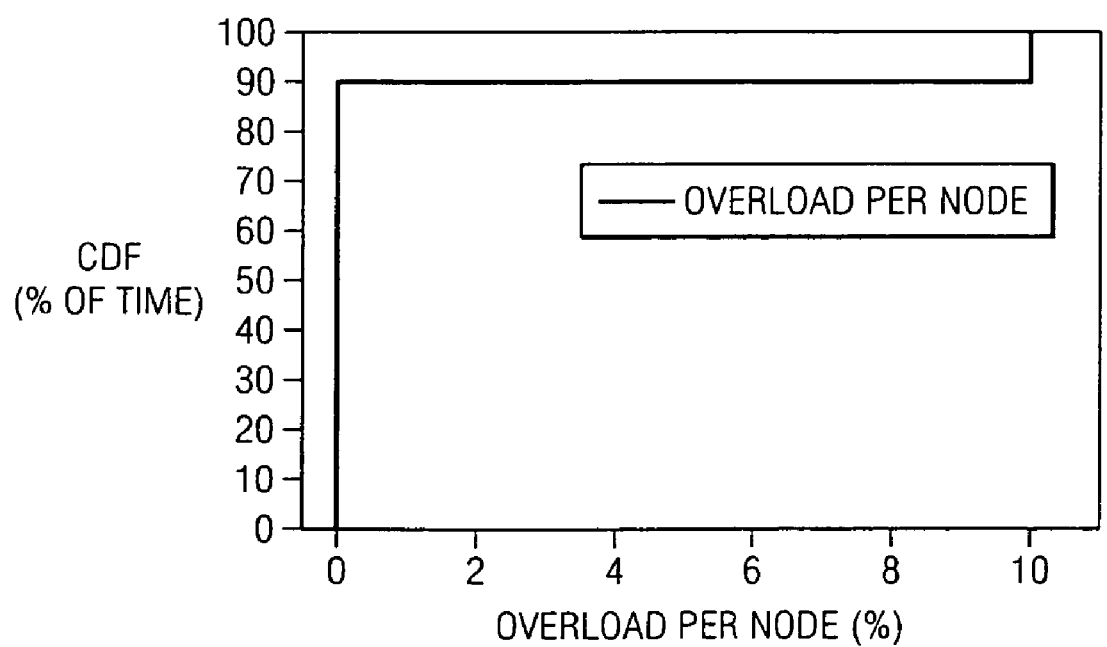
FIG. 11B shows a graph illustrating an amount of overload per node in an example 3-node media cluster for each of the example workloads of FIGS. 10A and 10B.

Since the peak service demand is 3.3 nodes, in the 3-node cluster, the applied load reaches 110% per node, i.e. the maximum overload per node reaches 10%, and it is observed for 10% of the time for both workloads, as shown in the graph of FIG. 11B.

While the "aggregate" amount of overload per node is the same for both workloads, there is a significant qualitative difference in the amount of "continuous" overload exhibited in the two example workloads considered above. Intuitively, while the "Thin Spikes" workload of FIG. 10A looks more bursty, the amount of overload per any continuous hour is limited: no more than 10 min of 10% overload. For the "Fat Spikes" workload of FIG. 10B, any 1-hour interval between the time stamps 500 and 600 experiences a continuous 10% overload.

From a quality of service (QoS) point of view, short spikes of performance degradations are less devastating than longer periods of degraded performance. As described further herein, certain embodiments provide a capacity planning tool that analyzes a given workload for the amount of continuous overload and is capable of taking this information into account during the capacity planning process. More specifically, certain embodiments enable a service provider to set limits (via the Performability Parameters 104B) on the amount of continuous overload that is encountered by a desired media server configuration under an expected workload, as described further below. Accordingly, Performability Capacity Planning of block 902, in accordance with certain embodiments, analyzes the performance of a given workload on the media server configuration recommended by the Basic Capacity Planning process (of block 901) for the amount of possible overload in any continuous time period of duration I during the regular processing time and during node failure periods.

More specifically, in accordance with certain embodiments capacity planner 101 builds an interval overload profile in the manner described hereafter. Let the N-node cluster be a media server configuration recommended by the Basic Capacity Planning process for a given workload 201, and let I be a duration of time interval of interest (in min). For computing the I-interval overload profile, service demand profile computed during the Basic Capacity Planning process (described above) is utilized. In accordance with one embodiment, a "moving window" technique is used. That is, a window is set to be I min duration, and the window is advanced by some step, "Step," e.g., advanced by a 1 min step. In certain embodiments, a service provider may specify (e.g., as part of Performability Parameters 104B) the interval value I and/or the step value Step to be used by the capacity planner in its evaluation. For each such I-interval, any service demand above N nodes is aggregated, and the result is averaged over N×I. This way, the average overload per node can be evaluated in any I-interval over the entire workload duration. Thus, the resulting I-interval overload profile is a list of pairs ($t_i$, $d_i$) reflecting that in the I-interval starting in time $t_i$ the average overload is $d_i$. For Performability Capacity Planning analysis (block 902 of FIG. 9) according to one embodiment, capacity planner 101 computes a cumulative density function (CDF) of aggregate I-interval overload which is normalized over the number of intervals.

Tables 2 and 3 each provide examples of interval overload profiles that may be used by the capacity planner in accordance with at least one embodiment herein for performing interval analysis of media server configuration's capability for supporting a given workload. That is, an interval analysis of the amount of overload experienced by the media server configuration during each interval of a given workload may be used for evaluating the quality of service provided by such media server configuration under the given workload.

TABLE 2

First Example Interval Overload Profile

| Interval Starting Time | Average Overload for Interval I |
|---|---|
| $t_1$ | 5% |
| $t_2$ | 10% |
| $t_3$ | 3% |
| . | . |
| . | . |
| . | . |
| $t_T$ | 7% |

Table 2 shows a first example interval overload profile. Such interval overload profile may be derived for each of a plurality of different types of servers that are included in a heterogeneous cluster under evaluation. As mentioned above, the interval overload profile may include a list of pairs ($t_i$, $d_i$) reflecting that in the I-interval starting in time $t_i$ the average overload is $d_i$. For instance, in Table 2, the I-interval starting at time $t_1$ of the given workload has an average overload of 5%, the I-interval starting at time $t_2$ of the given workload has an average overload of 10%, the I-interval starting at time $t_3$ of the given workload has an average overload of 3%, and the last I-interval starting at time $t_T$ of the given workload has an average overload of 7%. The amount of time between the interval starting times, such as the amount of time between starting times $t_1$ and $t_2$, is referred to as the Step. Thus, the I-interval provides a "window" of time that is stepped through the workload at a defined amount for the Step. For example, Table 2 may represent an interval overload profile for an interval of I=60 min with a Step=1 min. In this case, each of starting times $t_1$, $t_2$, . . . , $t_T$ are separated by 1 min of time in the workload, and the corresponding overload percentages specify the average amount of overload for a 60 min window of time starting at the corresponding starting time. Thus, because the defined Step amount (1 min) is smaller than the defined interval I (60 min), in this example, the interval windows overlap each other.

TABLE 3

Second Example Interval Overload Profile

| Interval Starting Time | Average Overload for Interval A (10 min) | Average Overload for Interval B (30 min) | Average Overload for Interval C (60 min) |
|---|---|---|---|
| $t_1$ | 0% | 8% | 11% |
| $t_2$ | 33% | 15% | 13% |
| $t_3$ | 20% | 10% | 7% |
| . | . | . | . |
| . | . | . | . |
| . | . | . | . |

Table 3 shows a second example interval overload profile. In this example, the interval overload profile includes a list of starting times and corresponding average overloads for different intervals (10 min, 30 min, and 60 min). Thus, this provides a list of $(t_i, d_i^{I=10}, d_i^{I=30}, d_i^{I=60})$ reflecting that starting at time $t_i$ the average overload for interval I=10 min is $d_i^{I=10}$, the average overload for interval I=30 min is $d_i^{I=30}$, and the average overload for interval I=60 min is $d_i^{I=60}$. For instance, in Table 3, the 10 min interval starting at time $t_1$ of the given workload has an average overload of 0%, the 30 min interval starting at time $t_1$ of the given workload has an average overload of 8%, and the 60 min interval starting at time $t_1$ of the given workload has an average overload of 11%. As with Table 2, the amount of time between the interval starting times, such as the amount of time between starting times $t_1$ and $t_2$, is referred to as the Step and may be defined (e.g., by a service provider) to be, for example, 1 min. The interval overload profiles described above may be derived for each type of server configuration included in a heterogeneous cluster under evaluation and/or an integrated overload profile may be derived reflecting the overall profile for the heterogeneous cluster under evaluation.

Figure 12A:
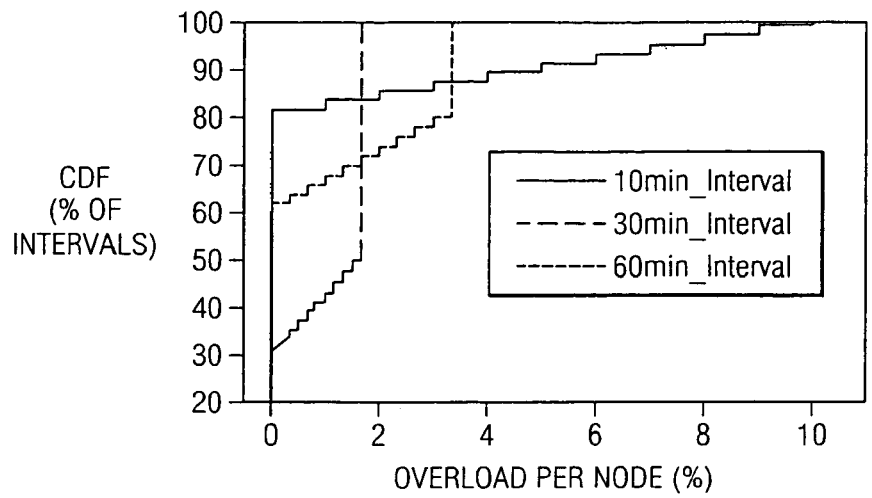
FIG. 12A shows a graph illustrating the CDF of I-interval overload for I=10 min, 30 min, and 60 min for the example Thin Spikes workload of FIG. 10A.
Figure 12B:
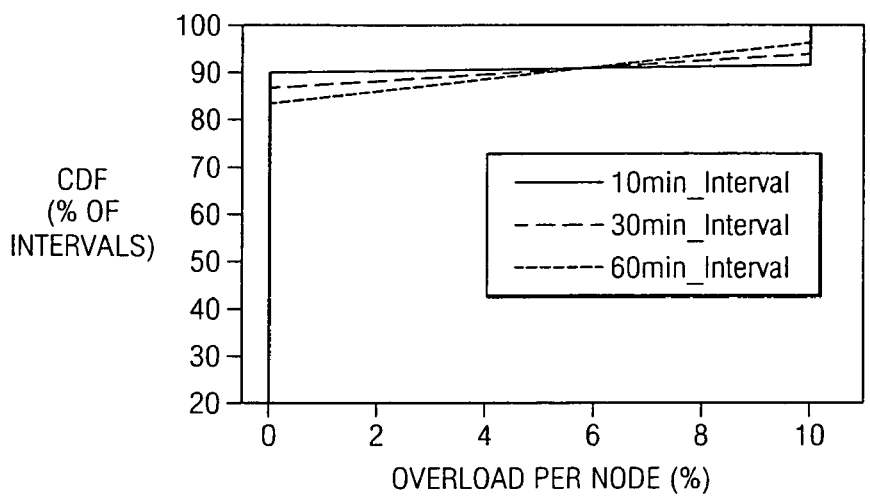
FIG. 12B shows a graph illustrating the CDF of I-interval overload for I=10 min, 30 min, and 60 min for the example Fat Spikes workload of FIG. 10B.

In particular, for the two example workloads considered above in FIGS. 10A ("Thin Spikes" workload) and 10B ("Fat Spikes" workload) and the 3-node cluster configuration determined in the example Basic Capacity Planning process described above, let us further consider the I-interval overload profiles for I=10 min, 30 min, and 60 min, as examples. FIG. 12A shows the CDF of I-interval overload for I=10 min, 30 min, and 60 min for the example Thin Spikes workload of FIG. 10A. FIG. 12B shows the CDF of I-interval overload for I=10 min, 30 min, and 60 min for the example Fat Spikes workload of FIG. 10B. For the "Thin Spikes" workload, the CDF of the three interval overload profiles are very different, as shown in the graph of FIG. 12A. For I of longer duration, the overall percentage of intervals with overload is higher than for I of shorter duration. However, the amount of average overload in longer intervals is correspondingly lower. It is consistent with the nature of access pattern in this example Thin Spikes workload: while the longer intervals more likely have the overloaded time periods within them, these overload periods are short, which leads to a lower average overload per interval. In contrast, for the "Fat Spikes" workload, the percentage of overloaded intervals and the amount of overload per interval are similar for all the three profiles, as shown in FIG. 12B, thus reflecting the longer periods of continuous overload in the given workload.

Suppose now that the service provider specifies in a performability parameter (as a Regular-Mode Overload Constraint 12) that a desirable media server solution is one in which the amount of average overload is limited by 2% in any 60 min interval under the expected workload 201. Let us consider and compose the CDF of 60 min-interval overload profiles for the example "Thin Spikes" workload (of FIG. 10A) and for the example "Fat Spikes" workload (of FIG. 10B). In the example "Thin Spikes" workload, only 30% of the 60 min-intervals do not have any overload, while in the "Fat Spikes" workload, the percentage of 60 min-intervals that do not have any overload reaches 84%. However, in the "Thin Spikes" workload, the average overload is limited by 2% in any 60 min-interval, while in the "Fat Spikes" workload, 10% of the 60 min-intervals have overload higher than 2%. Thus, for the "Thin Spikes" workload, the 3-node cluster solution for the corresponding server configuration type (e.g., $S_1$) satisfies this performability parameter. For the "Fat Spikes" workload, the 3-node cluster solution does not satisfy the overload constraint defined in this performability parameter for the corresponding server configuration type, and capacity planner 101 will thus consider and iteratively verify a 4-node solution. For the "FatSpikes" workload, the 4-node cluster is the minimal solution satisfying the given performability parameter in this example.

Let us denote the outcome of the performability capacity planning for acceptable overload during the Regular-Mode processing (i.e., with no failed nodes) as $D_{Overload}^{Reg}$.

In defining the performability parameters 104B, the service provider should choose the duration of interval, I, and degree of overload which reflects the service tolerance to overload (or QoS degradation of the service). Specifying a short overload interval (i.e., setting the tolerance to continuous overload being very low) might diminish the usefulness of interval overload analysis because the CDF of interval overload profile will closely represent the CDF "tail" of the original service demand, and it might result in the "overprovisioning" for rare and short demand spikes.

Additionally, the I-interval overload profile may provide a very useful insight into possible performance degradation in case of a node failure in the cluster. When a node failure happens in the N-node cluster, it can still provide the service with the remaining N−1 nodes, but possibly, at a price of degraded performance. As mentioned above, media traffic is often very bursty, and hence, it is likely that N−1 nodes are able to support the applied traffic during some time periods without performance degradation and be significantly overloaded during the other ones. Since a node failure lasts a continuous period of time, the I-interval overload analysis for the N−1 node cluster provides both quantitative and qualitative characterization of possible amount of overload and its nature in case of a node failure. Similar analysis can be performed for 2-node failures, etc. Thus, in certain embodiments, a service provider may specify, as a Node-Failure Mode Overload Constraint 13, an amount of overload permissible for any number of node failures (e.g., no more than X % overload for 1 node failure, no more than Y % overload for 2 node failures, etc.).

Figure 12C:
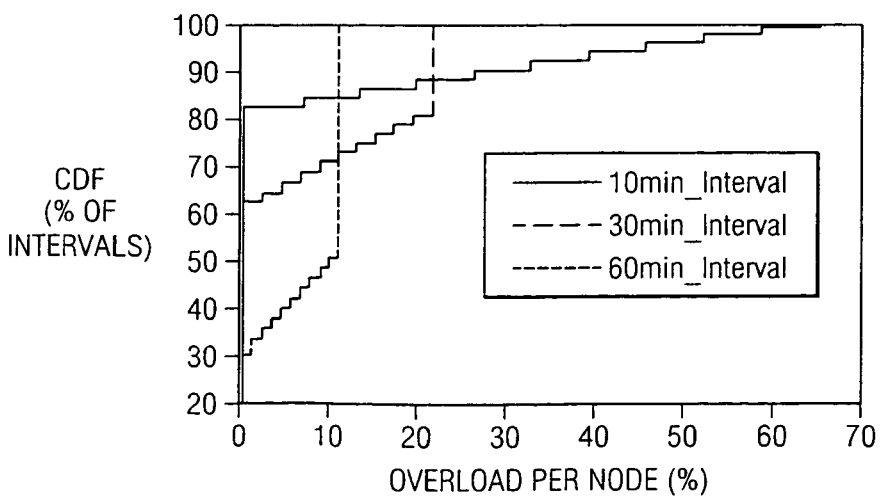
FIG. 12C shows a graph of the CDF of I-interval overload for I=10 min, 30 min, and 60 min in the case in which the example 3-node cluster (of FIG. 11B) has one failed node and the remaining 2-node cluster is processing the example "Thin Spikes" workload of FIG. 10A.

FIG. 12C shows a graph of the CDF of I-interval overload for I=10 min, 30 min, and 60 min in the case in which the 3-node cluster (determined in the above example) has one failed node and the remaining 2-node cluster is processing the example "Thin Spikes" workload of FIG. 10A. While there are 10 min intervals with high continuous overload reaching 65%, these intervals are very rare, and 80% of 10 min intervals do not have any overload.

Suppose now that the service provider specifies in a performability parameter (as a Node-Failure Mode Overload Constraint 13) that a desirable media server solution is one in which in the case of 1-node failure in the media cluster the amount of average overload per node in the remaining system is limited by 20% in any 60 min interval under the expected workload 201. To satisfy this performability parameter, capacity planner 101 will recommend a 3-node cluster solution for the example "Thin Spikes" workload and a 4-node cluster solution for the example "Fat Spikes" workload. Let us denote the outcome of the Performability Capacity Planning for acceptable overload during 1-node failures as $D_{Overload}^{N-1}$.

In accordance with at least one embodiment, the Performability analysis (of block 902 of FIG. 9) enables the service provider to evaluate the performance of a given workload on the configuration recommended by the Basic Capacity Planning process for the amount of possible overload in any continuous time period of duration I both during the Regular-Mode processing time (with no failed nodes in the media server cluster) and during the Node-Failure Mode periods (with one or more failed nodes in the media server cluster). The service provider can specify the appropriate parameters for the Performability Capacity Planning by defining: Regular-Mode Overload Constraints 12 and Node-Failure Mode Overload Constraints 13.

In the above example, the desirable media server configuration may be determined by capacity planner 101 as: $D_{overall} = \max(D_{basic}, D_{Overload}^{Reg}, D_{Overload}^{N-1})$ rounded up to the closest integer. $D_{overall}$ is computed for each of the server types (e.g., $S_1$, $S_2$, and $S_3$) that are implemented in the heterogeneous cluster under evaluation. Accordingly, in the example in which the heterogeneous cluster under evaluation has one or more nodes of each of server types $S_1$, $S_2$, and $S_3$, capacity planner 101 computes $D_{overall}$ for each of $S_1$, $S_2$, and $S_3$ (e.g., $D_{overall\_S1}$, $D_{overall\_S2}$ and $D_{overall\_S3}$).

Considering further the cluster size validation performed in operational block 903 of FIG. 9, in accordance with one embodiment, if the configuration recommended by the capacity planning process of operational blocks 901 and 902 is a single machine configuration (as in block 803 of FIG. 8A) then the capacity planning procedure is completed. Otherwise, capacity planner 101 performs an additional refinement of the cluster sizing by evaluating the impact of the load balancing solution as well as the implications of the increased overall cluster memory (such as described above with FIG. 8B). While in certain embodiments, such validation is performed after completion of both the Basic Capacity Planning and the Performability Capacity Planning processes (of blocks 901 and 902), in certain other embodiments such validation is performed after the Basic Capacity Planning process of operational block 901 if such Basic Capacity Planning process recommends a multi-node cluster solution instead of or in addition to such validation being performed after the Performability Capacity Planning process of operational block 902. For instance, such validation may first be performed to ensure that a proper number of clustered nodes (for each type of server configuration included in a heterogeneous cluster) is determined during the Basic Capacity Planning process to arrive at an initial media server configuration that is capable of supporting the expected workload in compliance with specified Basic Capacity Parameters 104A. Thereafter, such initial media server configuration determined during the Basic Capacity Planning process may be evaluated and, if appropriate, refined in operational block 902 to arrive at a solution that is capable of supporting the expected workload in compliance with specified Performability Parameters 104B. Of course, if the Performability Capacity Planning process of operational block 902 arrives at a multi-node cluster solution, the cluster number validation process may be performed to ensure that a proper number of clustered nodes is determined during the Performability Capacity Planning process.

A cluster of N nodes of a given type of server configuration represents N times greater processing power, and at the same time, it has N times larger combined memory. Accordingly, if the computed outcome is a multi-node solution for any of the different types of server configurations included in a heterogeneous media server cluster, it is desirable to re-evaluate workload performance on the cluster of recommended size by taking into account the load-balancing solution and the impact of increased memory (due to multiple nodes), as in the example validation process of FIG. 8B and operational block 903 of FIG. 9.

Figure 13:
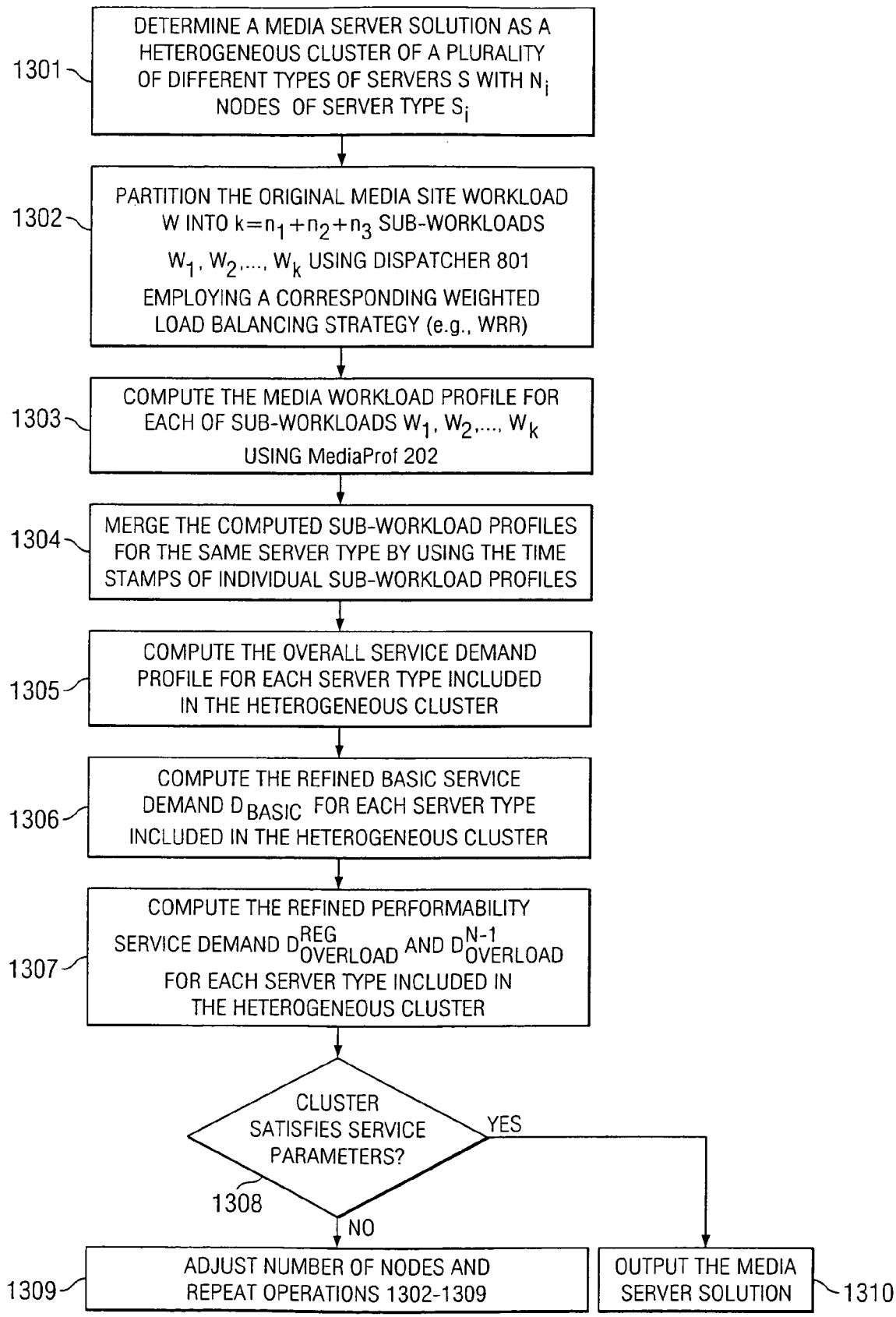
FIG. 13 shows an operational flow diagram for an example cluster size validation process in accordance with one embodiment.

FIG. 13 shows an operational flow diagram for an example of such a cluster size validation process in accordance with one embodiment. In operational block 1301, a heterogeneous cluster to be evaluated is determined, where the heterogeneous cluster includes a plurality of different types of servers S (e.g., server types $S_1$, $S_2$, $S_3$) with Ni nodes of server type Si.

That is, one or more nodes of each of the plurality of different types of servers are included in the heterogeneous cluster under evaluation. For instance, in certain implementations, the heterogeneous cluster is determined to include $n_1$ servers of type $S_1$, $n_2$ servers of type $S_2$, and $n_3$ servers of type $S_3$, where $n_1 \leq N_1$, $n_2 \leq N_2$, $n_3 \leq N_3$. In operational block 1302, dispatcher 801 employs a corresponding weighted load balancing strategy (e.g., the WRR strategy) to partition the expected media site workload W (labeled 201 in FIG. 8A) into $k=n_1+n_2+n_3$ sub-workloads $W_1, W_2, \ldots, W_k$. In operational block 1303, MediaProf 202 computes the media workload profile for each of sub-workloads $W_1, W_2, \ldots, W_k$. In operational block 1304, MediaProf 202 merges the computed sub-workload profiles for the same server type by using the timestamps of the individual sub-workloads (as in operational blocks $803_{1-3}$ of FIG. 8B). At this point, in evaluating the example heterogeneous cluster having servers types $S_1$, $S_2$, and $S_3$, we have three workload profiles 203—one for each of the server of types.

In operational block 1305, capacity planner 101 uses the generated workload profiles 203 to compute a service demand profile for each of the server types using the corresponding cost functions for each server type. Thus, capacity planner 101 computes: a demand profile $D_1$ for the workload that is processed by servers of type $S_1$, a demand profile $D_2$ for the workload that is processed by servers of type $S_2$, and demand profile $D_3$ for the workload that is processed by servers of type $S_3$. In operational block 1306, capacity planner 101 performs Basic Capacity Planning (operation 901 of FIG. 9) to compute, for each server type in the heterogeneous cluster, the refined basic service demand $D_{basic}$. In operational block 1307, capacity planner 101 performs Performability Capacity Planning (operation 902 of FIG. 9) to compute, for each server type in the heterogeneous cluster, the refined performability service demand $D_{Overload}^{Reg}$ and $D_{Overload}^{N-1}$.

In operational block 1308, capacity planner 101 computes $$D_{Overall} = \max(D_{basic}, D_{Overload}^{Reg}, D_{Overload}^{N-1}),$$

for each server type in the heterogeneous cluster, to determine the service demand for the corresponding $n_i$ nodes of server $S_i$ supporting its allocated portion of the expected workload. In doing so, capacity planner 101 computes the interval overload profiles for each of the three $D_1$, $D_2$, and $D_3$ service demand profiles as follows: Let the $n_i$-node sub-cluster (i.e., the $n_i$ nodes of server type $S_i$ included in the heterogeneous cluster) be a configuration of server $S_i$ recommended by the basic capacity planning process for a given workload, and let I be a duration of time interval of interest (in min). For computing the I-interval overload profile, a "moving window" technique is used for each $D_i$ of the three $D_1$, $D_2$, and $D_3$ service demand profiles. In one example implementation, the window may be set to 1 min duration, and it may be advanced with 1 min steps. For each such I-interval, the capacity planner 101 aggregates any service demand above $n_i$ nodes, and the result is averaged over $n_i \times I$. This way, the average overload per node (of server type $S_i$) in any I-interval over the entire workload duration can be evaluated. Thus, the I-interval overload profile is the list of pairs $(t_i, d_i)$ reflecting that in the I-interval starting in time $t_i$ the average overload is $d_i$. For performability analysis, the capacity planner 101 computes a CDF of aggregate I-interval overload which is normalized over the number of intervals for each of the three $D_1$, $D_2$, and $D_3$ (in our example) service demand profiles.

If the CDF of each of the three $D_1$, $D_2$, and $D_3$ service demand profiles satisfies the specified Regular-mode Overload Constraints 12, then the identified configuration moves to the next stage and is checked for Node-Failure-mode Overload Constraint 13, the operation of which according to this example implementation is discussed further below. Otherwise, if for one of the workload service demand profile $D_i$ (of server type $S_i$) the specified Regular-mode Overload Constraints 12 are not satisfied, then let the $S_{small}$ server type be the "smallest" capacity server (of the $S_i$ servers, i.e., $S_1$, $S_2$, and $S_3$ in this example) that does not satisfy the Regular-mode Overload Constraints 12 and which has available nodes to be added to the cluster solution. Then the performability stage for the Regular-mode Overload Constraints 12 is repeated for a new heterogeneous cluster configuration: where the $S_{small}$ server type is comprised of $n_i+1$ nodes. That is, the number of nodes of the $S_{small}$ server type is increased. In selecting the $S_{small}$ server type, in case if all the nodes of a server type $S_i$ are exhausted, then let the server type $S_{small}$ be the server type $S_j$ that is closest by capacity to the server type $S_i$ and that has available nodes to be added to the cluster solution, and let the server type $S_j$ be with the cheapest cost (we would like to minimize the cost of the overall configuration). Then the performability stage for the Regular-mode Overload Constraints 12 is repeated for a new heterogeneous cluster configuration, where the $S_{small}$ server type is comprised of $n_j+1$ nodes. Otherwise, if the existing collection of servers ($N_1$ of $S_1$, $N_2$ of $S_2$, $N_3$ of $S_3$) is not sufficient to support a given traffic with the desirable performance requirements then the service provider may need to add the sufficient number of the "cheapest" server type to get the desirable cluster configuration.

Once the CDF of each of the three $D_1$, $D_2$, and $D_3$ service demand profiles of a heterogeneous cluster under evaluation satisfies the specified Regular-mode Overload Constraints 12, then the identified configuration moves to the next stage and is checked for Node-Failure-mode Overload Constraint 13. In performing the Node-Failure-mode Overload Constraints Capacity Planning Stage in this example implementation, let the solution identified at the previous step have $n_1$ servers of type $S_1$, $n_2$ servers of type $S_2$, and $n_3$ servers of type $S_3$. Further, suppose the service provider specifies the following Performability Parameter of the desirable performance in case of 1-node failure in the media cluster: "Based on the past workload history, find an appropriate cluster solution such that in case of 1-node failure the amount of average overload per node in the remaining system is limited by 20% in any 60 min interval". Also, let the server type $S_1$ be the server with the largest capacity in the cluster (i.e. $N_1^{all} \leq N_2^{all} \leq N_3^{all}$) It becomes desirable to identify the cluster configuration which will satisfy the Node-Failure-mode Overload Constraints 13 in the case when one node of server type $S_1$ fails. That is, if we can identify the cluster configuration which satisfies the $S_1$-node Failure Overload Constraints 13 then it will automatically satisfy the $S_i$-node failure Overload Constraints 13 where failed node $S_i$ has a smaller capacity than server type $S_1$.

In this example implementation, the following operational steps to evaluate the Node-Failure-mode Overload Constraints 13 for the identified cluster solution are performed by the capacity planning tool:

1) partitioning the original media site workload W into $k=(n_1-1)+n_2+n_3$ sub-workloads $W_1, W_2, \ldots, W_k$ using dispatcher 801 employing the corresponding WRR load balancing strategy;
2) computing the media workload profile for each of sub-workloads $W_1, W_2, \ldots, W_k$ using MediaProf 202;
3) merging the computed sub-workload profiles for the same server type by using the time stamps of individual sub-workloads: i.e. at this point we have the three workload profiles 203, one for each of servers of type $S_1$, $S_2$, $S_3$;
4) computing the service demand profiles for those three workload profiles by using the corresponding cost functions for each media server type, i.e $D_1$ for the workload that is processed by servers of type $S_1$, $D_2$ for the workload that is processed servers of type $S_2$, and $D_3$ for the workload that is processed servers of type $S_3$.

After that, we compute the interval overload profiles for each of the three $D_1$, $D_2$, and $D_3$ service demand profiles. If the CDF of each of the three interval profiles satisfies the specified Node-Failure-mode Overload Constraints 13 then the identified configuration may be a suitable one.

Otherwise, if for one of the interval overload profiles $I(D_i)$ (the interval overload profile of server type $S_1$) the specified Node-Failure-mode Overload Constraints 13 are not satisfied, then let the $S_1$ server type that is the "smallest" capacity server that does not satisfy the Node-Failure-mode Overload Constraints 13 and which has available nodes to be added to the cluster solution. Then, the performability stage for the Node-Failure-mode Overload Constraints 13 is repeated for a new heterogeneous cluster configuration: where the $S_i$ server type is comprised of $n_i+1$ nodes.

In case if all the nodes of a server type $S_i$ are exhausted, then let the server type $S_j$ be the closest by capacity to the server type $S_i$ that has available nodes to be added to the cluster solution, and let the server type $S_j$ be with the cheapest cost (in case, when there is a choice of the same capacity servers, since we would like to minimize the cost of the overall configuration). Then the performability stage for the Node-Failure-mode Overload Constraints 13 is repeated for a new heterogeneous cluster configuration, where the $S_j$ server type is comprised of $n_j+1$ nodes. Otherwise, if the existing collection of servers ($N_1$ of $S_1$, $N_2$ of $S_2$, $N_3$ of $S_3$) is not sufficient to support a given traffic with the desirable performance requirements then the service provider may need to add the sufficient number of the "cheapest" server type to get the desirable cluster configuration.

In view of the above, in block 1308, the capacity planning tool determines whether the heterogeneous cluster under evaluation satisfies the server parameters 104, including the Basic Capacity Parameters 104A and the Performability Parameters 104B. If the heterogeneous cluster does not satisfy the service parameters, then the number of nodes of one or more of the server types included in the heterogeneous cluster is adjusted (increased) in block 1309 and the operations are repeated to evaluate the new cluster. If, on the other hand, the heterogeneous cluster under evaluation does satisfy the service parameters, then this solution may be output in block 1310 as a suitable solution for the service provider's site.

Figure 14:
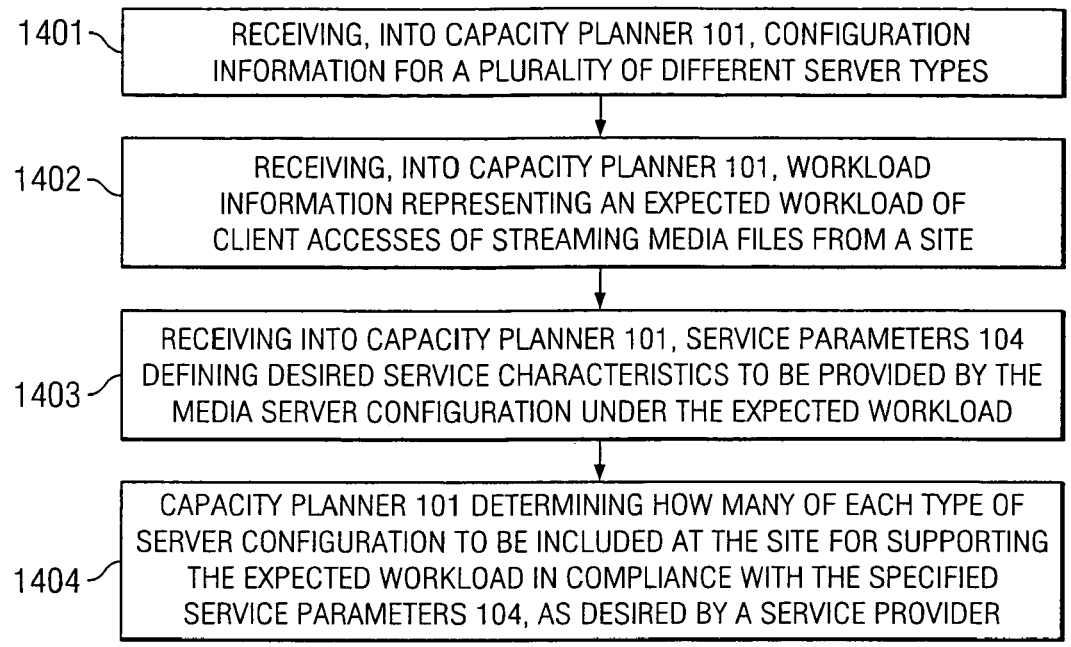
FIG. 14 shows an operational flow diagram of one embodiment for using a capacity planning tool.

FIG. 14 shows an operational flow diagram of one embodiment for using a capacity planning tool, such as the example capacity planning systems described above. As shown, operational block 1401 receives configuration information for a plurality of different server configuration types into a capacity planning tool. As examples, capacity planner 101 may have such configuration information input by a user (e.g., a service provider), or capacity planner 101 may read such configuration information from a data storage device (e.g., RAM, hard disk, etc.) of the capacity planning system (e.g., the configuration information may be pre-stored to the capacity planning system). Operational block 1402 receives into the capacity planning tool workload information representing an expected workload of client accesses of streaming media files from a site. In operational block 1403, the capacity planning tool receives service parameters 104 that define desired service characteristics to be provided by the media server configuration under the expected workload. In accordance with various embodiments, such service parameters 104 may be input by a user (e.g., a service provider), or capacity planner 101 may read such service parameters 104 from a data storage device (e.g., RAM, hard disk, etc.) of the capacity planning system. For instance, the service parameters 104 may be pre-stored to the capacity planning system (e.g., stored as profile information for a given service provider that details the service characteristics, such as Basic Capacity Parameters and Performability Parameters, desired by the service provider). In operational block 1404, capacity planner 101 determines how many nodes of each type of the plurality of different server configurations to be included at the site for supporting the expected workload in compliance with the specified service parameters 104, as desired by the service provider.

When implemented via computer-executable instructions, various elements of embodiments described herein for evaluating server configuration(s)' capacity for supporting an expected workload are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 15:
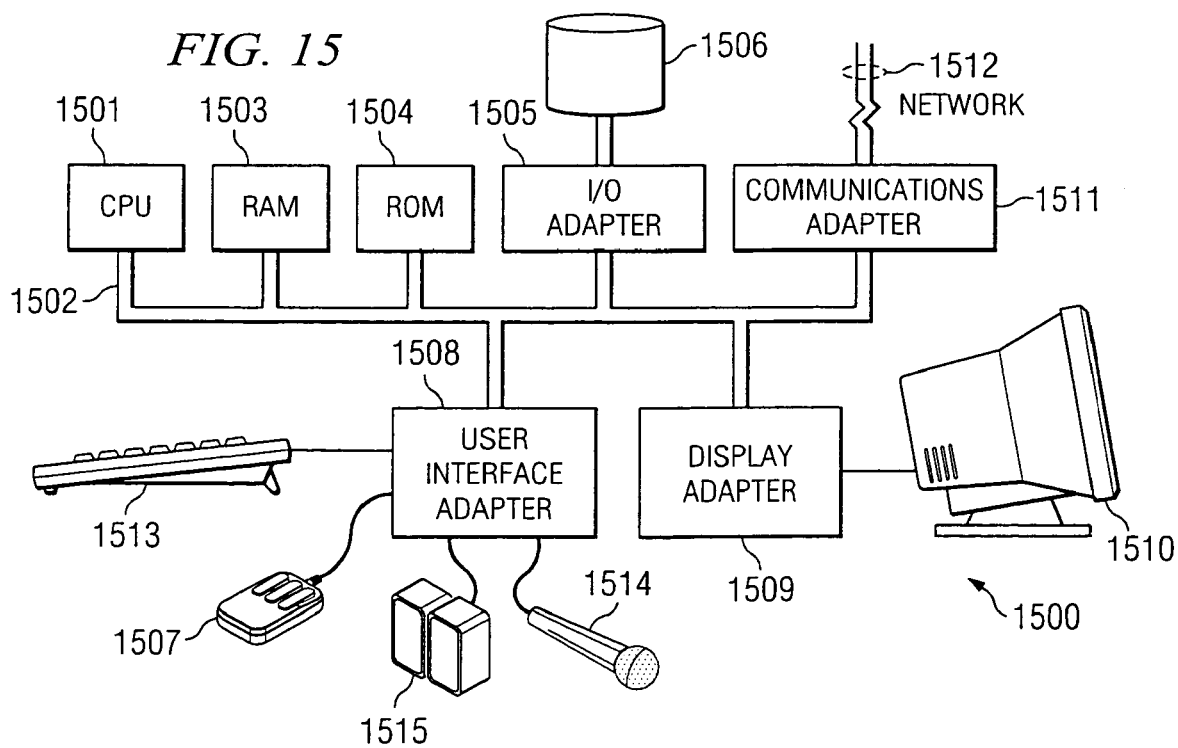
FIG. 15 shows an example computer system adapted to provide an embodiment of a capacity planning system.

FIG. 15 illustrates an example computer system 1500 adapted according to an embodiment for evaluating server configuration(s') capacity for supporting an expected workload. That is, computer system 1500 comprises an example system on which embodiments described herein may be implemented. Central processing unit (CPU) 1501 is coupled to system bus 1502. CPU 1501 may be any general purpose CPU. The above-described embodiments of a capacity planning system are not restricted by the architecture of CPU 1501 as long as CPU 1501 supports the inventive operations as described herein. CPU 1501 may execute the various logical instructions according to embodiments described herein. For example, CPU 1501 may execute machine-level instructions according to the exemplary operational flows described above in conjunction with FIGS. 6, 7, 9, 13, and 14.

Computer system 1500 also preferably includes random access memory (RAM) 1503, which may be SRAM, DRAM, SDRAM, or the like. Computer system 1500 preferably includes read-only memory (ROM) 1504 which may be PROM, EPROM, EEPROM, or the like. RAM 1503 and ROM 1504 hold user and system data and programs, as is well known in the art.

Computer system 1500 also preferably includes input/output (I/O) adapter 1505, communications adapter 1511, user interface adapter 1408, and display adapter 1509. I/O adapter 1505, user interface adapter 1508, and/or communications adapter 1511 may, in certain embodiments, enable a user to interact with computer system 1500 in order to input information thereto.

I/O adapter 1505 preferably connects storage device(s) 1506, such as one or more of hard drive, compact disc (CD) drive, floppy disk drive, tape drive, etc. to computer system 1500. The storage devices may be utilized when RAM 1503 is insufficient for the memory requirements associated with storing data for application programs. RAM 1503, ROM 1504, and/or storage devices 1506 may be used for storing computer-executable code for evaluating the capacity of server configuration(s) in accordance with the embodiments described above. Communications adapter 1511 is preferably adapted to couple computer system 1500 to network 1512.

User interface adapter 1508 couples user input devices, such as keyboard 1513, pointing device 1507, and microphone 1514 and/or output devices, such as speaker(s) 1515 to computer system 1500. Display adapter 1509 is driven by CPU 1501 to control the display on display device 1510.

It shall be appreciated that the embodiments of a capacity planning system described herein are not limited to the architecture of system 1500. For example, any suitable processor-based device may be utilized, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments described above.

What is claimed is:

1. A method comprising:
   receiving, into a capacity planning system having a central processing unit, workload information representing an expected workload of client accesses of streaming media files from a site;
   receiving, into said capacity planning system, at least one service parameter that defines a target service characteristic to be provided by a heterogeneous cluster of servers under the expected workload, wherein the heterogeneous cluster has servers of different configuration types, wherein said at least one service parameter comprises at least one performability parameter that defines a limit on an amount of degradation of service encountered during a percentage of time that said heterogeneous cluster is overloaded under the expected workload; and
   said capacity planning system determining a number of servers of each of the different configuration types to include in said heterogeneous cluster to enable said heterogeneous cluster to support the expected workload in compliance with said at least one service parameter.

2. The method of claim 1 wherein said at least one service parameter further comprises at least one performability parameter that defines the target service characteristic to be provided by said heterogeneous cluster during periods of degraded service under the expected workload.

3. The method of claim 1 wherein said at least one service parameter further comprises at least one performability parameter that defines the target service characteristic to be provided by said heterogeneous cluster including the determined numbers of servers of the respective different configuration types during periods of degraded service under the expected workload.

4. The method of claim 1 wherein said at least one service parameter further comprises at least one basic capacity parameter that defines a target level of service during normal conditions.

5. The method of claim 4 wherein said at least one basic capacity parameter comprises at least one selected from the group consisting of:
   a statistical demand guarantee that specifies a limit on the percentage of time that said heterogeneous cluster is overloaded under the expected workload, and a utilization constraint that specifies a limit on percentage of time that said heterogeneous cluster is at or near its capacity under a expected workload.

6. The method of claim 4 wherein said at least one service parameter further comprises at least one performability parameter that defines a limit on the amount of continuous overload encountered at any given time by said heterogeneous cluster under the expected workload.

7. The method of claim 1, further comprising:
selecting, by said capacity planning system, a type of load balancing strategy from among a plurality of types of load balancing strategies to use for the expected workload in compliance with said at least one service parameter.

8. A method comprising:
receiving, into a capacity planning system having a central processing unit, workload information representing an expected workload of client accesses of streaming media files from a site;
receiving, into said capacity planning system, at least one service parameter that defines a target service characteristic to be provided by a heterogeneous cluster of servers under the expected workload, wherein the heterogeneous cluster has servers of different configuration types; and
said capacity planning system determining a number of servers of each the different configurations types to include in said heterogeneous cluster to enable said heterogeneous cluster to support the expected workload in compliance with said at least one service parameter,
wherein said at least one service parameter comprises at least one selected from the group consisting of:
a regular-mode overload constraint that specifies a limit on the amount of degradation in service that is encountered during periods of degraded service under regular system operation of said heterogeneous cluster where no node failure is present in the heterogeneous cluster, and
a node-failure-mode overload constraint that specifies a limit on the amount of degradation in service that is encountered during periods in which one or more nodes of said heterogeneous cluster have failed.

9. A method comprising:
receiving, into a capacity planning system having a central processing unit, workload information representing an expected workload of client accesses of streaming media files from a site;
receiving, into said capacity planning system, at least one service parameter that defines a target service characteristic to be provided by a heterogeneous cluster of servers during periods of degraded service under the expected workload,
wherein said at least one service parameter comprises at least one peformability parameter that comprises at least one selected from the group consisting of:
a regular-mode overload constraint the specifies a limit on the amount of degradation in service that is encountered during periods of performance degradation under regular system operation of said heterogeneous cluster where no node failure is present in the heterogeneous cluster, and
a node-failure-mode overload constraint that specifies a limit on the amount of degradation in service that encountered during periods in which one or more nodes of said heterogeneous cluster have failed;
determining, by said capacity planning system, for each of a plurality of different types of server configurations included in said heterogeneous cluster, how many servers to be included in said heterogeneous cluster for supporting the expected workload in compliance with said at least one service parameter; and
selecting, by said capacity planning system, a type of load balancing strategy from among a plurality of types of load balancing strategies to use for the expected workload in compliance with said at least one service parameter.

10. The method of claim 9 wherein said at least one service parameter further comprises at least one performability parameter that defines a target service characteristic to be provided by each of said plurality of different types of server configurations included in said heterogeneous cluster during periods of degraded service under the expected workload.

11. The method of claim 9, wherein determining for each of the plurality of different types of server configurations included in said heterogeneous cluster, how many servers to be included in said heterogeneous cluster for supporting the expected workload in compliance with said at least one service parameter, comprises determining a number of servers of a first type of server configuration and a number of servers of a second type of server configuration to include in said heterogeneous cluster.

12. A method comprising:
receiving, into a capacity planning tool executed in a computer system, information about a first server configuration;
receiving, into said capacity planning tool, information about a second different server configuration;
receiving, into said capacity planning tool executed in a computer system, workload information representing an expected workload of client accesses of streaming media files from a site;
receiving, into said capacity planning tool executed in a computer system, at least one performability parameter that defines a target service characteristic to be provided, during non-compliant periods of operation under the expected workload, by a heterogeneous cluster that includes nodes of said first server configuration and nodes of said second server configuration, wherein said non-compliant periods of operation comprise periods of degraded performance in servicing said expected workload, wherein said perfomability parameter defines a limit on an amount of degradation of service encountered during said non-compliant periods of operation; and
determining, by said capacity planning tool executed in a computer system, a number of nodes of said first server configuration and a number of nodes of said second server configuration to include in said heterogeneous cluster to enable said heterogeneous cluster to support the expected workload in compliance with said at least one performability parameter.

13. The method of claim 12 wherein said degraded performance is performance in which said heterogeneous cluster is unable to satisfy real-time constraints of at least one stream being served.

14. The method of claim 12 wherein said degraded performance is performance in which said heterogeneous cluster is unable to serve at least one stream so as to avoid interruptions in the presentation of such stream.

15. The method of claim 12 wherein said degraded performance results from overload of said heterogeneous cluster.

16. The method of claim 12 wherein said non-compliant periods of operation further comprise periods of at least one node failure of said heterogeneous cluster.

17. The method of claim 12 further comprising:
receiving, into said capacity planning tool, at least one basic capacity parameter that defines a target service characteristic to be provided by said heterogeneous cluster during compliant periods of operation under the expected workload.

18. The method of claim 17 wherein said compliant periods of operation comprise periods in which said heterogeneous cluster is not overloaded under the expected workload.

19. The method of claim 18 further comprising:
said capacity planning tool determining the number of the servers of said first server configuration and the number of the servers of said second server configuration to be included in said heterogeneous cluster to enable said heterogeneous cluster to support the expected workload in compliance with said at least one basic capacity parameter and said at least one performability parameter.

20. The method of claim 12, further comprising:
selecting, by said capacity planning tool, a type of load balancing strategy from among a plurality of types of load balancing strategies to use for the expected workload in compliance with said at least one performability parameter.

21. A method comprising:
receiving, into a capacity planning tool, workload information representing an expected workload of client accesses of streaming media files over a period of time T;
said capacity planning tool determining, for each of a plurality of different types of server configurations included in a heterogeneous cluster under evaluation, an amount of overload encountered by such type of server configuration during each of a plurality of time intervals of said expected workload, and wherein said capacity planning tool receives at least one performability parameter that comprises at least one selected from the group consisting of:
regular-mode overload constraint that specifies a limit on the amount of degradation in service the is encountered during periods of performance degradation under regular system operation of at least one of said plurality of different types of server configuration where no node failure is present in the heterogeneous cluster, and
a node-failure-mode overload constraint that specifies a limit on the amount of degradation in service that is encountered during periods in which one or more nodes of at least one of said plurality of different types of server configuration have failed.

22. The method of claim 21 where each of said plurality of time intervals has a size I where I<T.

23. The method of claim 21 wherein beginning points of each of said plurality of time intervals are separated by a Step amount, wherein said Step<I.

24. The method of claim 23 wherein each of said intervals has a duration of 1 hour and said Step is 1 minute.

25. The method of claim 21 wherein said capacity planning tool evaluates said amount of overload encountered by each of said plurality of different types of server configurations during each of said plurality of time intervals to determine whether the plurality of different types of server configurations satisfy said at least one performability parameter.

26. The method of claim 21, further comprising:
selecting, by said capacity planning tool, a type of load balancing strategy from among a plurality of types of load balancing strategies to use for the expected workload in compliance with said at least one performability parameter.

27. A system comprising:
a central processing unit; and
a capacity planning tool executable on the central processing unit to:
receive workload information representing an expected workload of client accesses of streaming media files from a site over a period of time T;
receive at least one service parameter that defines a target service characteristic to be provided by a heterogeneous cluster of servers under the expected workload, wherein the heterogeneous cluster has servers of different configuration types,
wherein said at least one service parameter comprises at least one perfomablilty parameter the defines a limit on an amount of degradation of service encountered during a percentage of time that said heterogeneous cluster is overloaded under the expected workload; and
determine a number of servers of each of the different configuration types to include in said heterogeneous cluster to enable said heterogeneous cluster to support the expected workload in compliance with said at least one service parameter.

28. The system of claim 27 wherein said at least one service parameter further comprises at least one selected from the group consisting of:
a regular-mode overload constraint that specifies a limit on the amount of degradation in service that is encountered during periods of performance degradation under regular system operation of said heterogeneous cluster where no node failure is present in said heterogeneous cluster, and
a node-failure-mode overload constraint that specifies a limit on the amount of degradation in service that is encountered during periods in which one or more nodes of said heterogeneous cluster have failed.

29. The system of claim 27, wherein the capacity planning tool is executable to:
select a type of load balancing strategy from among a plurality of types of load balancing strategies to use for the expected workload in compliance with said at least one service parameter.

30. A system comprising:
a central processing unit;
a media profiler executable on the central processing unit to receive workload information for a service provider's site and generate a workload profile for each of a plurality of different types of server configurations included in a heterogeneous cluster under consideration for supporting the service provider's site; and
a capacity planner executable on the central processing unit to:
receive the generated workload profiles for the different types of server configurations of the heterogeneous cluster under consideration and evaluate whether the heterogeneous cluster provides sufficient capacity for supporting the site's workload in compliance with defined performability parameters that specify a limit on degradation of quality of service provided by said heterogeneous cluster during periods of degraded service, wherein said defined performability parameters comprise:
a regular-mode overload constraint tha specifies a limit on the amount of degradation in service tha is encountered during said periods of degraded service under regular system operation of said heterogeneous cluster where no node failure is present in the heterogeneous cluster, a node-failure-mode overload constraint that specifies a limit on the amount of degradation in service that is encountered during periods in which one or more nodes of said heterogeneous cluster have failed; and select a type of load balancing strategy from among a plurality of types of load balancing strategies to use for supporting the site's workload in compliance with said defined performability parameters.

31. The system of claim 30 wherein said periods of degraded service is periods in which said heterogeneous cluster is unable to serve at least one stream so as to avoid interruptions in the presentation of such stream.

32. The system of claim 30, wherein the capacity planner is executable to:

determine for each of the different types of server configurations, a number of servers of each corresponding type of server configuration to be included in said heterogeneous cluster for supporting the site's workload in compliance with said performability parameters.

\* \* \* \* \*

UNITED STATES PATENT AND TRADEMARK OFFICE
CERTIFICATE OF CORRECTION

| | |
|---|---|
| PATENT NO. | : 7,953,843 B2 |
| APPLICATION NO. | : 10/867392 |
| DATED | : May 31, 2011 |
| INVENTOR(S) | : Ludmila Cherkasova |

It is certified that error appears in the above-identified patent and that said Letters Patent is hereby corrected as shown below:

In column 49, line 1, in Claim 5, delete "percentage" and insert -- a percentage --, therefor.

In column 49, line 3, in Claim 5, delete "a" and insert -- the --, therefor.

In column 49, line 27, in Claim 8, delete "each the" and insert -- each of the --, therefor.

In column 49, line 27, in Claim 8, delete "configurations" and insert -- configuration --, therefor.

In column 49, line 54, in Claim 9, delete "peformability" and insert -- performability --, therefor.

In column 49, line 56, in Claim 9, delete "the" and insert -- that --, therefor.

In column 49, line 63, in Claim 9, after "that" insert -- is --.

In column 50, line 44, in Claim 12, delete "perfomability" and insert -- performability --, therefor.

In column 51, line 40, in Claim 21, before "regular" insert -- a --.

In column 51, line 41, in Claim 21, delete "the" and insert -- that --, therefor.

In column 52, line 17, in Claim 27, delete "perfomability" and insert -- performability --, therefor.

In column 52, line 17, in Claim 27, delete "the" and insert -- that --, therefor.

In column 52, line 66, in Claim 30, delete "tha" and insert -- that --, therefor.

In column 52, line 67, in Claim 30, delete "tha" and insert -- that --, therefor.

Signed and Sealed this
Twentieth Day of March, 2012

David J. Kappos
*Director of the United States Patent and Trademark Office*